(12) United States Patent
Ye et al.

(10) Patent No.: US 12,205,596 B2
(45) Date of Patent: *Jan. 21, 2025

(54) GENERATING AND USING TEXT-TO-SPEECH DATA FOR SPEECH RECOGNITION MODELS

(71) Applicant: Microsoft Technology Licensing, LLC, Redmond, WA (US)

(72) Inventors: Guoli Ye, Sammamish, WA (US); Yan Huang, Redmond, WA (US); Wenning Wei, Beijing (CN); Lei He, Beijing (CN); Eva Sharma, Vancouver (CA); Jian Wu, Bellevue, WA (US); Yao Tian, Beijing (CN); Edward C. Lin, Beijing (CN); Yifan Gong, Sammamish, WA (US); Rui Zhao, Bellevue, WA (US); Jinyu Li, Redmond, WA (US); William Maxwell Gale, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 153 days.

This patent is subject to a terminal disclaimer.

(21) Appl. No.: 18/108,316

(22) Filed: Feb. 10, 2023

(65) Prior Publication Data

US 2023/0186919 A1    Jun. 15, 2023

Related U.S. Application Data

(63) Continuation of application No. 15/931,788, filed on May 14, 2020, now Pat. No. 11,587,569.

(30) Foreign Application Priority Data

Mar. 31, 2020    (CN) .......................... 202010244661.4

(51) Int. Cl.
 *G10L 15/26* (2006.01)
 *G10L 13/08* (2013.01)
 (Continued)

(52) U.S. Cl.
 CPC .............. *G10L 15/26* (2013.01); *G10L 13/08* (2013.01); *G10L 15/063* (2013.01); *G10L 15/16* (2013.01)

(58) Field of Classification Search
 CPC ....... G10L 15/26; G10L 13/08; G10L 15/063; G10L 15/16; G10L 2015/088;
 (Continued)

(56) References Cited

U.S. PATENT DOCUMENTS

| | | | |
|---|---|---|---|
| 10,332,508 | B1 | 6/2019 | Hoffmeister |
| 2011/0288862 | A1 | 11/2011 | Todic |

FOREIGN PATENT DOCUMENTS

| | | |
|---|---|---|
| CN | 107516511 B | 12/2017 |
| CN | 107680597 B | 7/2019 |

OTHER PUBLICATIONS

Junqua et al, Word Spotting and Rejection, 1996, Robustness in Automatic Speech Recognition: Kluwer Academic Publishers, pp. 1-21 (Year: 1996).*

(Continued)

Primary Examiner — Linda Wong
(74) Attorney, Agent, or Firm — Workman Nydegger

(57) ABSTRACT

Systems, methods, and devices are provided for generating and using text-to-speech (TTS) data for improved speech recognition models. A main model is trained with keyword independent baseline training data. In some instances, acoustic and language model sub-components of the main model are modified with new TTS training data. In some instances, the new TTS training is obtained from a multi-speaker neural TTS system for a keyword that is underrep- (Continued)

resented in the baseline training data. In some instances, the new TTS training data is used for pronunciation learning and normalization of keyword dependent confidence scores in keyword spotting (KWS) applications. In some instances, the new TTS training data is used for rapid speaker adaptation in speech recognition models.

20 Claims, 13 Drawing Sheets

(51) Int. Cl.
*G10L 15/06* (2013.01)
*G10L 15/16* (2006.01)

(58) Field of Classification Search
CPC ....... G10L 25/30; G10L 15/065; G10L 13/02; G10L 17/24; G10L 17/04
See application file for complete search history.

(56) References Cited

OTHER PUBLICATIONS

Rose, Richard C., Word Spotting From Continuous Speech Utterances, 1999, Automatic Speech and Speaker Recognition: Kluwer Academic Publishers, pp. 303-329 (Year: 1996).*
Chai, Khe, et al., "Personalization of End-to-End Speech Recognition on Mobile Devices for Named Entities," Dec. 14, 2019, pp. 1-8.
Murthy, Savitha, et al., "Effect of TTS Generated Audio on OOV Detection and Word Error Rate in ASR for Low-resource Languages," Sep. 30, 2019, pp. 1-6.
Office Action Received for Chinese Application No. 202010244661. 4, (MS #408172-CN01) mailed on Feb. 8, 2024, 14 pages (English Translation Provided).
Office Action Received for European Application No. 21709203.0, mailed on Jan. 4, 2024, 5 pages.
U.S. Appl. No. 15/931,788, filed May 14, 2020.
Office Action Received for Chinese Application No. 202010244661. 4, (MS#408172-CN01), mailed on Jun. 6, 2024, 4 pages. (English Translation Provided).

* cited by examiner

GENERATING AND USING TEXT-TO-SPEECH DATA FOR SPEECH RECOGNITION MODELS

CROSS-REFERENCE TO RELATED APPLICATIONS

This application is a continuation of U.S. patent application Ser. No. 15/931,788 filed on May 14, 2020, entitled "GENERATING AND USING TEXT-TO-SPEECH DATA FOR SPEECH RECOGNITION MODELS," which application claims the benefit of and priority Chinese Application Serial No. 202010244661.4 filed on Mar. 31, 2020 and entitled "GENERATING AND USING TEXT-TO-SPEECH DATA FOR KEYWORD SPOTTING SYSTEMS AND SPEAKER ADAPTATION IN SPEECH RECOGNITION SYSTEMS," which applications are expressly incorporated herein by reference in their entirety.

BACKGROUND

A keyword spotting (KWS) task requires detecting a specific word in an audio speech signal, often for use as the "wake word" in speech-enabled devices, such as "Hey Cortana" in Microsoft Invoke, "Alexa" in Amazon Echo, and "Ok Google" in Google Home. With the rising popularity of end-to-end trained models for automatic speech recognition (ASR), such models have also been explored in the context of KWS applications, which are one type of ASR applications. Among these, the recurrent neural network transducer (RNN-T) model has shown promising results in KWS and other ASR applications. RNN-T models incorporate both the acoustic model and language model components into a single, jointly trained model.

RNN-T models often perform better than connectionist temporal classification (CTC) models, which do not have an explicit language model component. Moreover, the streaming property of RNN-T makes it ideal for a KWS task that requires online low-latency detection. Such RNN-T based KWS models are trained with a large amount of keyword independent speech data and can be trained to detect a specific keyword using a keyword specific decoding setup. This speech data is typically natural speech data collected from recording multiple speakers dictating any number of words, phrases, or sentences.

In spite of the overall improvement in RNN-T based KWS models, in practice, the KWS performance varies with different keywords. The model performs reasonably well for keywords appearing frequently in the data set used in the original training of the model. In contrast, performance deteriorates considerably for keywords whose phoneme sequences (or subsequences) appear rarely in the baseline training data. For instance, for a foreign name keyword, whose acoustic realization and phoneme sequence rarely appear in the baseline training data, the RNN-T based KWS model yields low acoustic and language model scores, culminating in a false rejection of the keyword by the KWS system (i.e., the speech-enabled device will not "wake up").

One method to overcome this sparsity of data in the baseline training data is to collect more training data that contains more instances of the keyword. However, it can be expensive in terms of resources, to identify suitable speakers that represent a broad range of acoustic features, create relevant scripts for the speakers to dictate, record the speech, clean the data, deploy into the baseline training data, and then retrain the entire model before deploying the retrained model on a speech-enabled device. Therefore, it is not a scalable solution for a system targeted to support any arbitrary keyword.

Machine learning models have also been used in other ASR applications, such as in speaker adaptation. For example, in a large-vocabulary speech recognition system, modeling heterogeneous acoustic data sources coming from diverse acoustic environments and different speakers with varying speaking styles or accents is a fundamental challenge. Very often, speaker adaptation is performed to move the speaker-independent model to better fit a specific speaker. However, adapting a model to a speaker or several speakers is challenging due to the massive number of model parameters and the limited amount of adaptation data. Where adaptation data corresponding to a speaker is very limited, the training of the model to the specific speaker is generally referred to as rapid speaker adaptation. Rapid speaker adaptation is a practically useful scenario in many speech production deployment scenarios.

Furthermore, in practical speech production deployment, it is hard to obtain human transcription for adaptation data due to online computation modes, security reasons, or cost. Unsupervised adaptation does not need to use human transcription. Instead, it makes use of speech recognition first-pass decoding results as supervision. It is therefore much more practically desirable in most speech production scenario. However, explicit labeling errors occurring during unsupervised adaptation (e.g., errors from a first-pass decoding result of the adaptation data) can lead to catastrophic gradient update in training the main model, especially in an unsupervised adaptation of the main model to a specific speaker or many different speakers.

Thus, there is a persistent and on-going need to overcome data sparsity for training models used for speech recognition, keyword spotting, and speaker adaptation. The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to systems, methods, and devices that can be used to facilitate and improve techniques for utilizing text-to-speech (TTS) training data in KWS systems. Disclosed embodiments also include systems, methods, and devices that can be used to facilitate improved techniques for generating TTS data to modify speech recognition models, such as in utilizing personalized speech synthesis for rapid speaker adaption.

For instance, some embodiments include methods, systems, and devices that are configured to modify a machine learning model with text-to-speech data. The machine learning model is trained for speech detection and/or recognition applications including ASR and KWS. In such embodiments, for example, a computing system includes one or more processors and one or more computer readable hardware storage devices. These hardware storage devices store computer-executable instructions that are structured to be executed by the processor(s). Execution of the computer-executable instructions cause the computing system to identify a main model trained with baseline training data. The main model includes a language model sub-component and an acoustic model sub-component. The computing system obtains new TTS training data and modifies at least the acoustic model and the language model of the main model with the new TTS training data to reduce a detection and/or speech recognition error of the main model in performing speech detection or performing speech recognition.

In some embodiments, the main model is an RNN-T based model used for KWS. Additionally, or alternatively, new training data is obtained from a multi-speaker neural TTS system. In some embodiments, the new TTS training data is obtained for a specific keyword when the specific keyword chosen for use in KWS is determined to be underrepresented in the baseline training data. In some embodiments, overfitting of the main model to the new TTS training data is avoided by mixing some of the new TTS training data with the baseline training data before modifying the main model.

In some embodiments, the new TTS training data is used to facilitate an improvement in pronunciation learning for KWS. In some embodiments, a confidence score indicating a probability that a keyword is present in a speech command is computed for the keyword that is potentially detected in the speech command. In such embodiments, the confidence score is normalized to a global confidence score scale and compared against a global confidence score threshold to determine if the detected keyword will be accepted by a speech-enabled device.

In some embodiments, the new TTS training data is generated using personalized speech synthesis for rapid speaker adaptation of the main model. In some instances, the new TTS training data is speech that is personalized to a particular speaker in terms of acoustic features of the particular speaker and/or in terms of content found in speech typically spoken by the particular speaker. Thus, wherein there is limited adaptation data (e.g., natural speech data) available for the particular speaker, a main model can undergo efficient and effective rapid speaker adaptation utilizing the personalized speech generated from a neural network language model (NNLM) generator and a neural TTS system. In some instances, the NNLM generator is used to generate content relevant text from a labeling of the adaptation data, and/or the neural TTS system is personalized to acoustic features of the particular speaker to generate synthesized speech from the content relevant text. In some embodiments, the use of the new TTS training data (i.e., synthesized personalized speech) mixed with the original adaptation data converts a previously unsupervised adaptation of the main model into a pseudo-supervised adaptation of the main model.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The disclosed embodiments relate to systems, methods, and devices that can be used to facilitate and perform speech recognition and keyword spotting technologies by utilizing techniques for generating and applying text-to-speech (TTS) data with speech recognition and keyword spotting models. It should be appreciated that in some instances, speech recognition and keyword spotting refer to separate technologies, models, or systems. In some instances, speech recognition and keyword spotting refer to the same technology, model, or system, and thus the terms may be used interchangeably throughout.

In some embodiments, a main model is trained with keyword independent baseline training data. In some embodiments, acoustic and language model sub-components of the main model are modified with new TTS training data. In some embodiments, the new TTS training is obtained from a multi-speaker neural TTS system for a keyword that is underrepresented in the baseline training data. In some embodiments, the new TTS training data is used for pronunciation learning and normalization of keyword dependent confidence scores in keyword spotting (KWS) applications.

One will appreciate that any feature or operation of any embodiment disclosed herein may be combined with any other feature or operation of any other embodiment disclosed herein. That is, none of the disclosed embodiments are required to be mutually exclusive. Furthermore, any of the content disclosed in any of the figures may be combined with any of the other content disclosed in any of the other figures.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about substantial benefits to the technical field of ASR systems, such as keyword spotting (KWS) systems and other ASR systems, because they can be used to reduce a speech recognition error of a model used in performing speech recognition. For instance, by practicing the disclosed principles, the embodiments are able to augment or supplement baseline training data with text-to-speech (TTS) data generated from a TTS system. Specifically, the TTS data can be used to overcome the problem of data sparsity in the application of customizing KWS systems for a specific keyword. In some instances, this may include training a model to generate personalized TTS data. In cases where the chosen keyword is underrepresented in the baseline training data, new TTS training data can be obtained to modify the model performing KWS.

Example Model Modification

Figure 1:
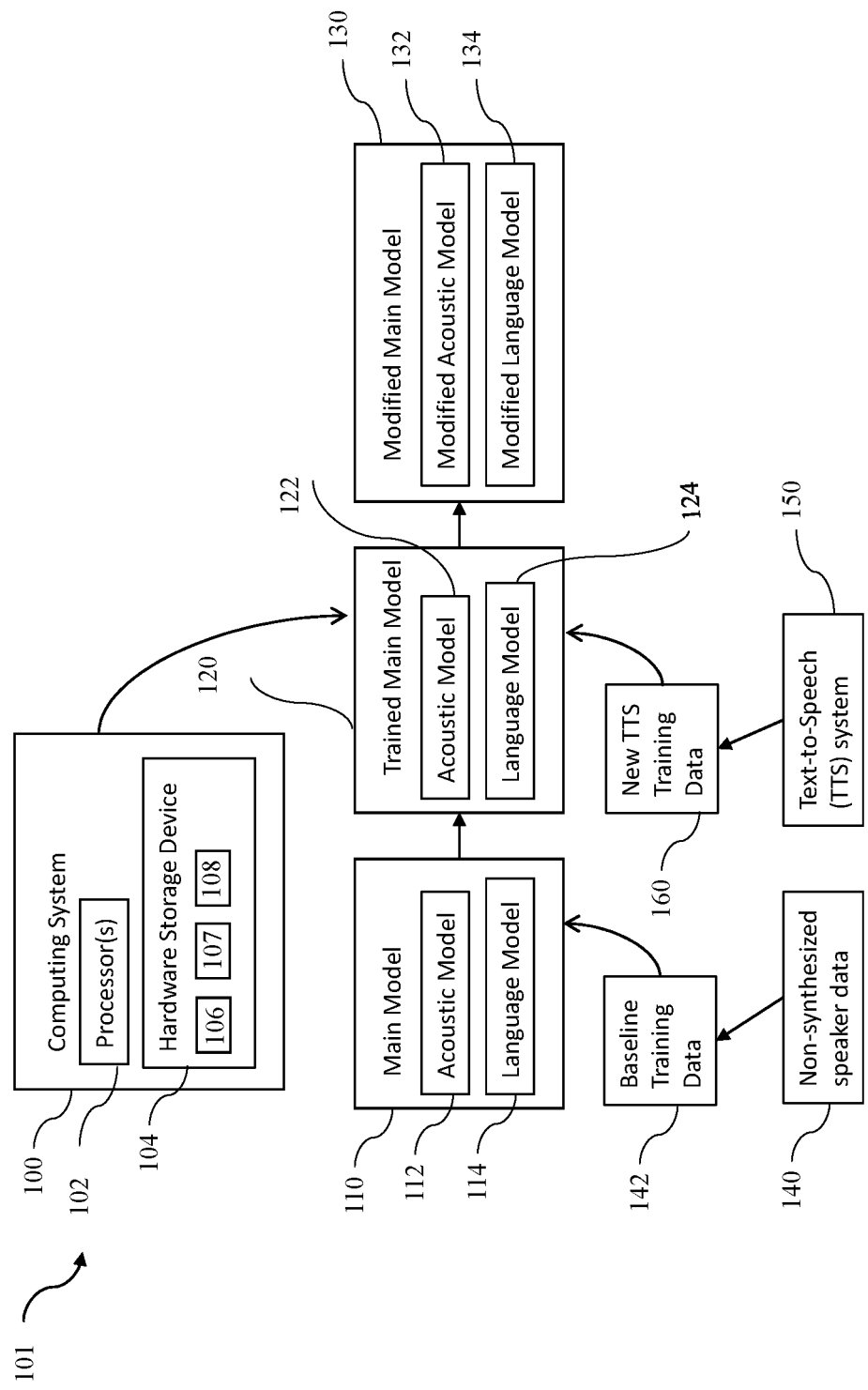
FIG. 1 illustrates a computing system that comprises and/or that may be used to implement disclosed embodiments, including but not limited to embodiments for modifying ASR models and other machine learning models with TTS training data.

Attention will now be directed to FIG. 1, which illustrates a computing system and generalized process flow diagram of process 101 for modifying a main model 110 using new TTS training data 160. It should be noted that a substantial portion of this disclosure is focused on the use of a recurrent neural network transducer (RNN-T) based model in keyword spotting (KWS) applications. However, the scope of functionality encompassed by the disclosed embodiments are not limited to being practiced using only RNN-T based models and are not limited to being practiced in only KWS applications. For example, it should be appreciated that the main model may be any model including an acoustic model and language model components. Additional operations may be performed on a seed RNN-T model before modification according to best practices in machine learning techniques. Furthermore, the main model 110 may be used more generally for automatic speech recognition (ASR) systems and applications. Additionally, or alternatively, the new TTS training day is used to facilitate an improvement in pronunciation learning performed by a model. In turn, this also reduces a detection and/or speech recognition error of speech by a speech recognition and/or keyword spotting model. As such, the disclosed principles should be interpreted broadly to encompass any type of speech detection, speech recognition, or keyword spotting scenario or any speech-enabled device. For instance, some embodiments may at least be partially practiced in a distributed cloud computing environment utilizing one or more ASR models.

A computing system 100 is provided and is shown including one or more processors 102 and one or more hardware storage devices 104. The hardware storage devices store computer-executable components or instructions (see identifiers 106, 107, 108). Although hardware storage device 104 is shown storing a certain number of computer-executable components 106, 107, 108, it is anticipated that the hardware storage device 104 is able to store any number of computer-executable instructions 106, 107, 108 such that the memory required to store the computer executable instructions 106, 107, 108 does not exceed the memory allocation associated with the hardware storage device 104.

The computing system 100 identifies a main model 110 comprising an acoustic model 112 and a language model 114 where the acoustic model 112 and language model 114 are subcomponents of the main model 110. The main model 110 is trained with baseline training data 142 compiled from a corpus of non-synthesized or natural speaker data. The corpus includes audio data from one or more speakers. The audio data represents a wide variety of phonemes and phoneme sequences as found in natural speech pertaining to a plurality of topics and situations.

In some embodiments, the baseline training data includes 30,000 hours of anonymized and transcribed production data with personally identifiable information removed. The production data is recorded in both close-talk and far-field conditions. Additionally, or alternatively, the data also includes standard noise simulation as well as room impulse response (RIR) simulation. The main model 110 is trained on the baseline data to configure the model for keyword-independent and speaker-independent use for speech recognition and keyword spotting applications.

The computing system 100 identifies the trained main model 120 with its corresponding acoustic model 122 and corresponding language model 124. The computing system 100 obtains new TTS training data 160 to modify the trained main model 120. The new TTS training data 160 is obtained from a TTS system 150. In general, TTS technology refers to systems and methods to synthetically generate waveform or audio data from text or scripts. In such a case, the new TTS training data 160 includes synthetic audio data that mimics natural speech. The more realistic the synthesized speech, the more effective the modified main model 130 is (i.e., the detection error (i.e., speech recognition error) of the modified main model 130 in performing speech recognition decreases in some proportion to the quality and realism of the new TTS training data). Improvements in speech recognition and keyword spotting applications are facilitated by increasing speaker diversity, increasing the amount of data per speaker, and application of data simulations for the new TTS training data 160. Further description of possible methods of obtaining new TTS training data 160 from a variety of TTS systems 150 is provided later in the detailed description herein.

The trained main model 120 is modified with the new TTS training data 160 by modifying the acoustic model 122 and the language model 124. The acoustic model 122 and language model 124 include one or more parameters that correspond to the function and configuration of the models 122, 124. The trained main model 120 is modified by modifying at least one parameter of the acoustic model 122 and at least one parameter of the language model 124. In some embodiments, all of the parameters of the acoustic model 122 and all of the parameters of the language model 124 are modified. In some embodiments, only some of the parameters of each model are modified. The modification of the main model 120, the acoustic model 122, and/or the language model 124 may also be termed adjustment, learning, training, tuning, and/or adaptation of the desired model. In some instances, the results of the modification with the new TTS training data 160 include the illustrated modified main model 130, including one or both of the modified acoustic model 132 and/or the modified language model 134.

In some embodiments, the hardware storage device 104 of the computing system 100 also stores one or more of the main model 110, the training model 122 and/or the modified main model 130. The hardware storage device 104 may also include, in some embodiments, one or more of the baseline training data 142, non-synthesized speaker data 140, new TTS training data 160 and/or the TTS system. In such embodiments, the computing system may be a stand-alone server, for example, or a distributed and/or cloud-based server system.

Figure 2:
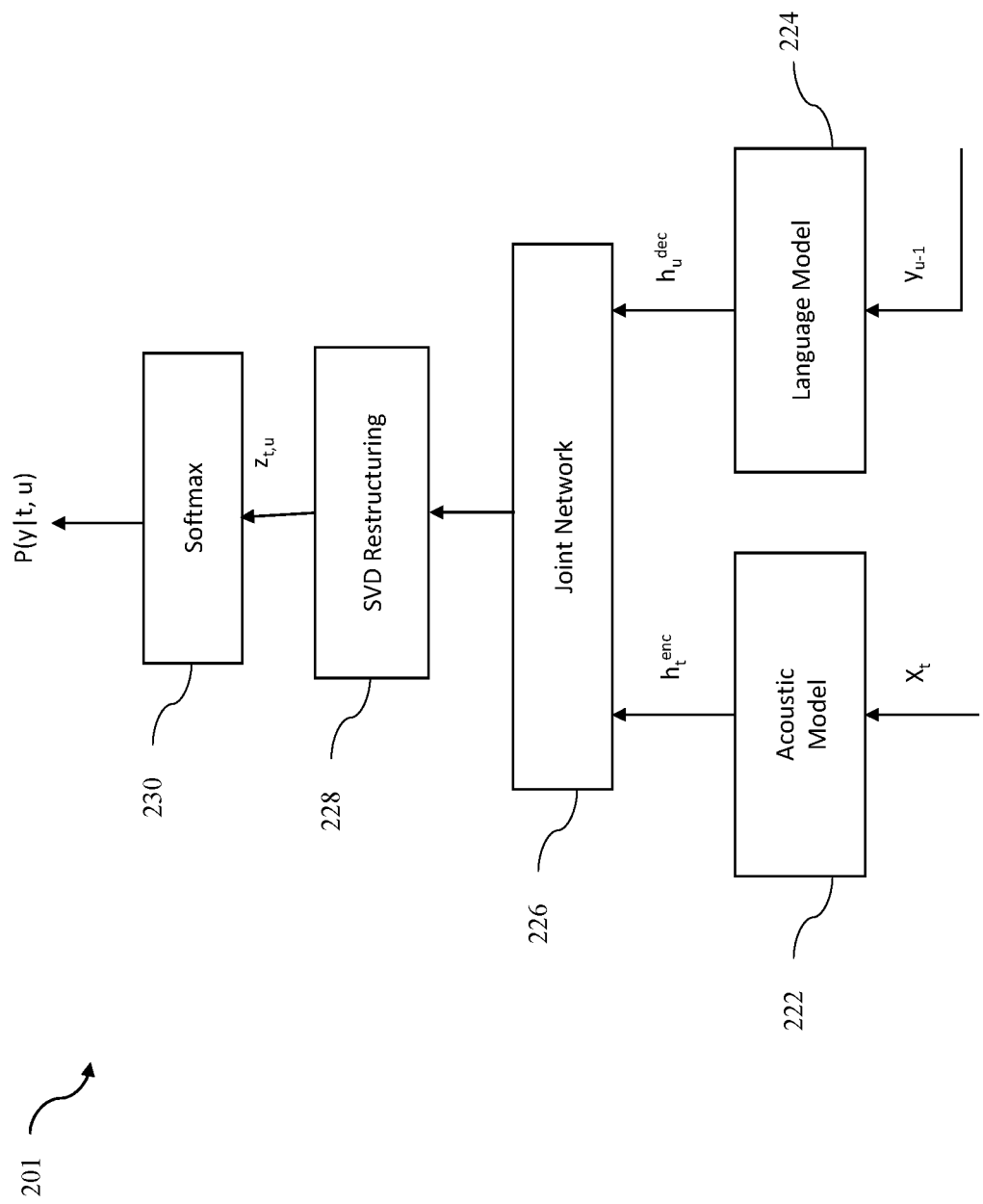
FIG. 2 illustrates an example configuration of a machine learning model used as a speech recognition model or keyword spotting model.

Referring now to FIG. 2, an example of one type of a trained main model 120 is shown as model 201, where model 201 represents an example of a main model 120 used in process 101. In some embodiments, model 201 is a recurrent neural network transducer (RNN-T) based model. Model 201 is shown including an acoustic model 222 and a language model 224 which are connected to a joint network 226. The acoustic model 222 may also be referred to as an encoder network. The language model 224 may also be referred to as a prediction network. The acoustic model 222 is configured to receive acoustic features ($x_t$) and convert the acoustic features ($x_t$) into a high-level representation ($h_t^{enc}$) where 't' is the time index. The language model 224 outputs a high-level representation ($h_t^{pre}$) by conditioning on a previous non-blank target $y_{u-1}$ predicted by the RNN-T model, where "u" is an output label index. In some embodiments, the joint network 226 is a feed-forward network that combines the acoustic model output ($h_t^{enc}$) and language model 224 output ($h_t^{pre}$). The output of the joint network 226 is output $z_{t,u}$ which is further connected to the output layer with a linear transformation. The final posterior for each output token is obtained applying the softmax operation 230. The loss function is given as L=−ln P(y|x), where "y" is the output label sequence for a given input acoustic feature sequence "x."

In some embodiments, the model 201 is configured with a stack of 80-dimension log Mel filter bank for every 10 milliseconds of speech to form a frame of 640-dimension input acoustic feature as the acoustic features ($x_t$) corresponding to the input to the acoustic model 222. It should be appreciated that the model may be configured to additional or alternate configurations, parameters, and dimensions. In some embodiments, the acoustic model 222, also known as the encoder network, includes a 5-layer layer-normalized long short-term memory (LSTM) with 384 hidden units at each layer. In some instances, the output for the joint network is a 384-dimension vector, but the output may include any vector suitable for applying a softmax layer 230. The input feature for the acoustic model 222 is shifted according to a defined time index, for example, every 30 milliseconds. The output unit ($h_t^{enc}$) is context independent phonemes.

An SVD restructuring is applied to the output of the joint network to reduce the size of the model with negligible accuracy loss. Thus, in some embodiments, the model 201 is a RNN-T SVD seed model, first trained on baseline training data (see FIG. 1, baseline training data 142) and then modified with new TTS training data (see FIG. 1, new TTS training data 160).

In some embodiments, model 201 or a sub-model of 201 (e.g., acoustic model 222, language model 244, and/or joint network 226) is configured as a connectionist temporal classification (CTC) model or other model able to be adapted by training on TTS data.

In some embodiments, the learning rate is tuned based on a keyword-dependent adaptation task. In some instances, the learning rate for keyword-dependent model adaptation is less than the learning rate used for the baseline training of the model.

In some embodiments, selective adaptation of the model is employed for each adaptation or training task. In some embodiments, the language model 224 or prediction network is frozen in the seed model 201. In some embodiments, the acoustic model 222 or encoder network is frozen in the seed model 201. In some embodiments, two bottom layers of the acoustic model 222 are frozen in the seed model to retrain the feature specific weights learned from the seed model trained on baseline training data (see baseline training data 142 of FIG. 1) while the rest of the layers of the acoustic model 222 are adapted using new TTS training data (see new TTS training data 160 of FIG. 1).

To avoid overfitting, in some embodiments, natural speech training data (see baseline training data 142 of FIG. 1) is mixed with synthesized speech training data (see new TTS training data 160 of FIG. 1) to train and/or modify the model 201. The ratio between synthesized speech and natural speech varies depending on the desired modification of the model 201. In some embodiments, where the amount of synthesized speech data is much greater than the amount of natural speech data, a weighting is applied to the natural speech data to balance the aforementioned ratio. Mixing the data achieves a higher correct accept (CA) score (especially in the case of modifying a model for a custom keyword) as compared to CA scores from testing the originally trained seed model (see trained main model 120 of FIG. 1).

Figure 3:
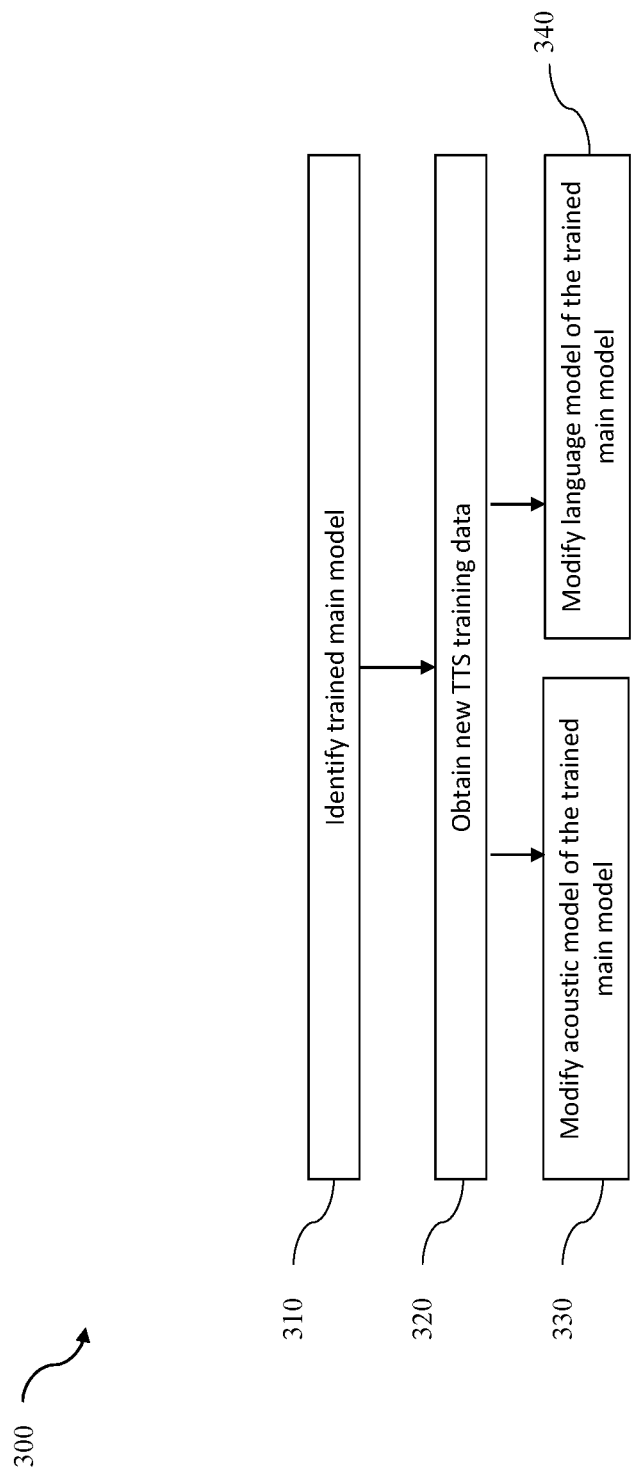
FIG. 3 illustrates a flowchart comprising acts associated with methods for modifying models with TTS training data.

Attention will now be directed to FIG. 3, which illustrates a flowchart 300 of acts associated with methods (e.g., method 300) for modifying a model with TTS data for speech recognition. These methods include, for example, a computing system, such as computing system 100 of FIG. 1, identifying a trained main model (act 310), which may, for example, correspond to trained main model 120 of FIG. 1 and/or model 201 of FIG. 2. In some embodiments, the trained main model may correspond to another model configured for speech recognition, for example, in a model being adapted via techniques disclosed herein for rapid speaker adaptation.

Next, the computing system obtains new TTS training data (act 320), which may, for example, correspond to the new TTS training data 160 of FIG. 1 and/or other TTS data described herein.

Then, the computing system will either concurrently, or serially, perform an act of modifying the acoustic model of the trained main model (act 330) and/or an act of modifying the language model of the trained main model (act 340). In some embodiments, the acoustic model and language model correspond to the acoustic model 122 and language model 124 of FIG. 1 and/or acoustic model 222 and language model 224 of FIG. 2.

Model Adaptation for Keyword Spotting

Figure 4:
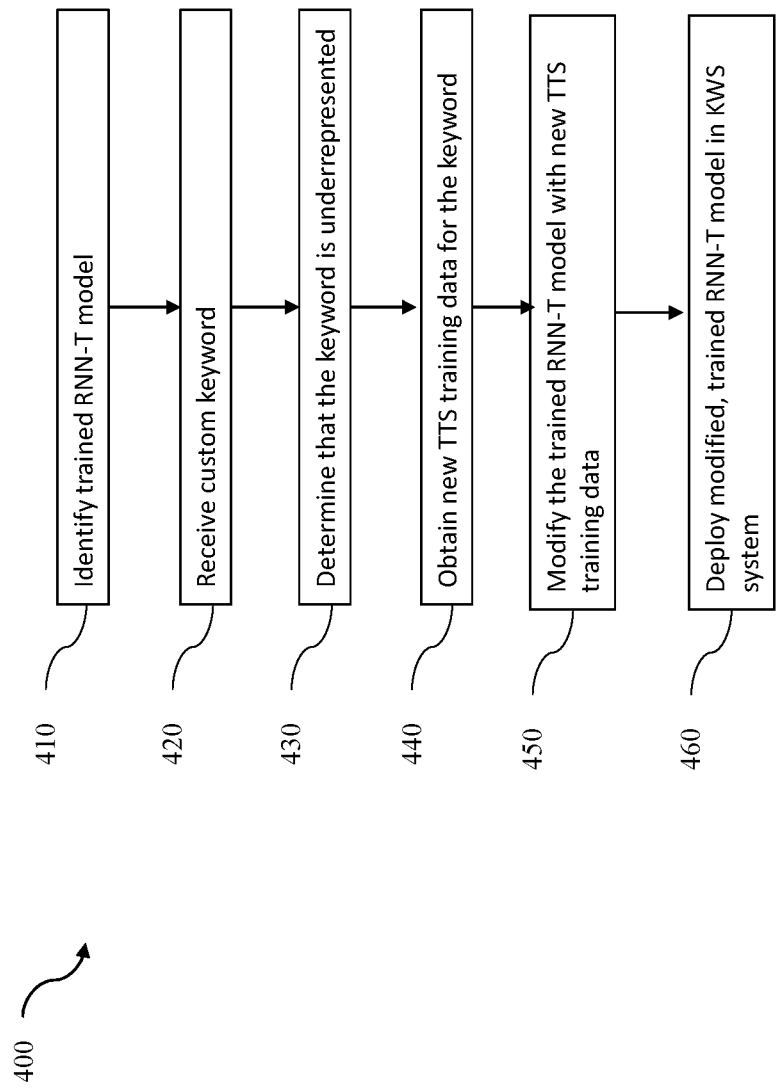
FIG. 4 illustrates a flowchart comprising acts associated with methods for modifying models with TTS training data for a custom keyword.

FIG. 4 illustrates a flow chart 400 of acts associated with methods (e.g., method 400) for modifying a model with TTS data that is obtained for a keyword that is underrepresented in available natural speech data. These methods include, for example, a computing system, such as computing system 100 of FIG. 1, for identifying a trained RNN-T model (act 410) which may, for example, correspond to the trained main model 120 of FIG. 1 and/or model 201 of FIG. 2.

As illustrated, the methods of FIG. 4 begin with a computing system receiving a custom keyword (act 420). In some embodiments, the keyword corresponds to keyword 712 of FIG. 7, a keyword potentially found in speech command 800 of FIG. 8 (see logic gate 912 of FIG. 9), and/or keyword 940 of FIG. 9. to Next, the computing system determines that the keyword received in the preceding act (act 420) may be a keyword that is determined to be underrepresented in the baseline training data (act 430). The baseline training data is data used to train the model identified in the first act (act 410) of method 400. (See the description for FIG. 5 for further information on determining that a keyword is underrepresented). In some embodiments, the baseline training data corresponds to baseline training data 142 of FIG. 1.

After determining that the keyword is underrepresented (act 430), the computing system obtains new TTS training data for the keyword (act 440). In some embodiments, the new TTS training data corresponds to the new TTS training data 160 of FIG. 1 and/or other TTS data described herein.

Then, the computing system modifies the trained RNN-T model with the new TTS training data (act 450). Optionally, the computing system deploys the modified/trained RNN-T model as part of a KWS system installed on or utilized by a speech-enabled device (act 460). Then, a keyword that is detected by the modified/trained RNN-T model is configured as a "wake up word" to "wake up" or activate the speech-enabled device (e.g. activate automatic speech recognition for virtual personal assistant task implementation).

Figure 5:
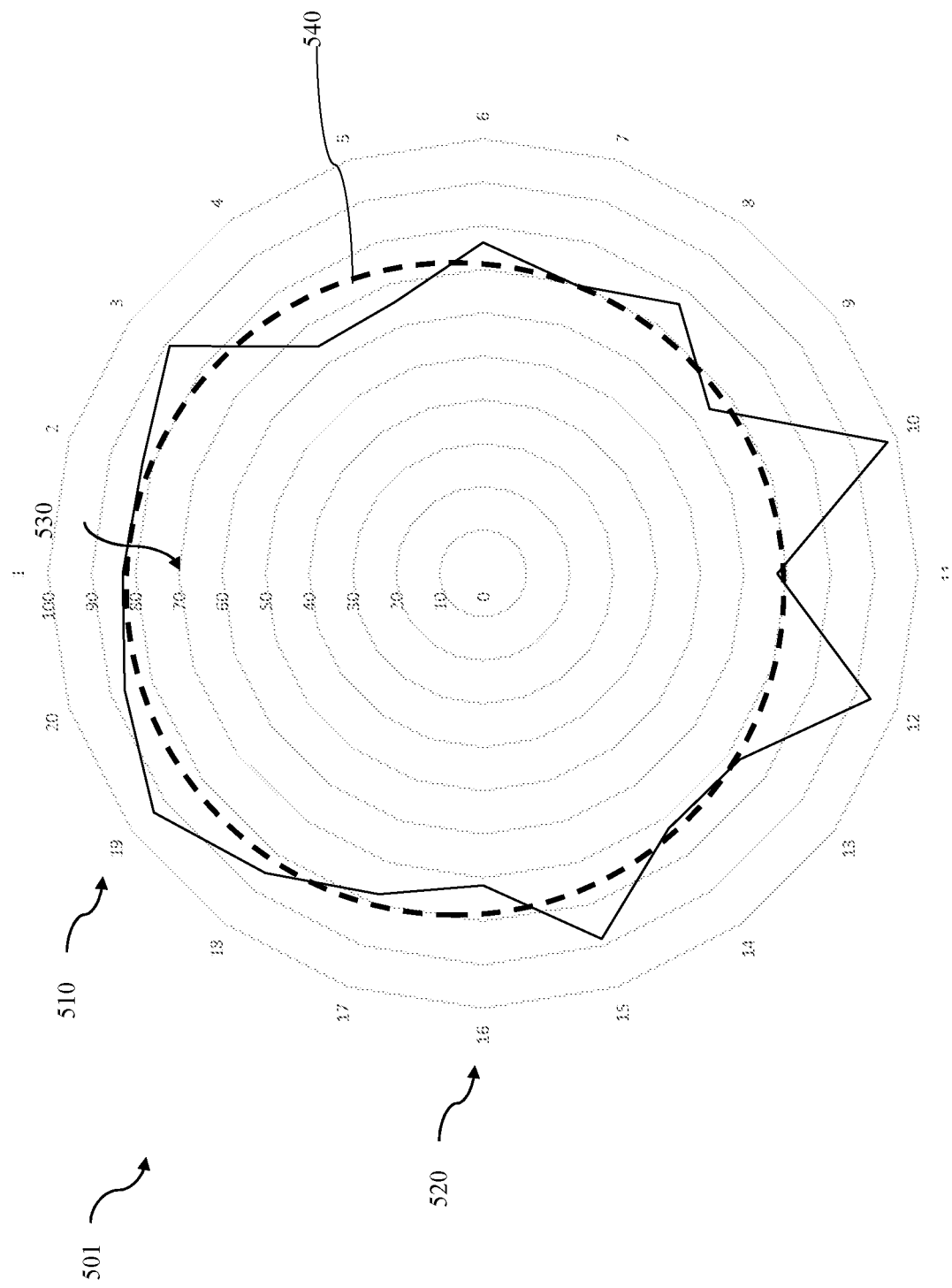
FIG. 5 illustrates a keyword independent threshold used for identifying underrepresented keywords.

Referring now to FIG. 5, a data chart 501 is shown that illustrates a plurality of keywords (510, 520) mapped according to a scale of confidence scores 530. The confidence scores 530 for particular words can be used as a basis to determine a likelihood that a KWS system will be able to accurately recognize the particular keywords when detected by the KWS systems. Additionally, or alternatively, the confidence scores 530 may be used as a basis to determine a likelihood that a general or specialized ASR system will be able to accurately recognize particular words or phrases when detected by the ASR system. In some embodiments, the confidence score 530 is calculated to reflect a measurement of a correct accept (CA) of the corresponding word/keyword associated with the confidence score, where CA is the ratio of the number of correctly accepted utterances and the total number of utterances containing the keywords, often reported as a percentage. Thus, in some embodiments, a keyword is determined to be underrepresented in the baseline data if the keyword corresponds to a low CA. Low CA for a keyword for an otherwise strong baseline model (i.e., a model that is well-trained on most words that could be used as keywords) may imply that the model was not able to learn to detect the underrepresented keyword since the model was not trained on enough training data for that particular keyword.

In some embodiments, the confidence score 530 corresponds to a measurement of false accepts (FA). FA is the number of falsely accepted utterances not containing the containing the concerned keyword. In some embodiments, the confidence score corresponds 530 to a measurement of false rejects (FR). FR is the number of non-accepted utterances that contain the keyword and should have been accepted. To facilitate an improvement in speech recognition and/or keyword spotting technology, a detection error of a keyword (or more broadly for any word) can be reduced by increasing the CA, decreasing the FA, and/or decreasing the FR.

In some cases, the test set per keyword used for measuring CA includes speech recorded in both clean (not noisy) environments, as well as noisy or at least noisier environments. The noise can be ambient or artificial noise paired with the presentation of the speech utterances. For measuring FA, a count is performed on the number of falsely accepted utterances of a target keyword by a model applied to an amount of natural speech data obtained from arbitrary recording (e.g., podcast data). To determine that a keyword is low-resource keyword and/or that the keyword is underrepresented in the baseline training data (see act 430 of FIG. 4), a confidence threshold is predefined before the trained model is applied to any new data sets.

Returning to FIG. 5, a confidence threshold 540 is illustrated by dashed lines at the 90% CA measurement. Thus, any keywords having a confidence score 530 less than the confidence threshold 540 are determined to be underrepresented in the baseline data. This may reflect, for example, that there is not enough baseline data containing utterances of the keyword to provide a high enough CA percentage and/or confidence score to be an effective wake-word for a speech-enabled device at the predetermined threshold. Different predetermined thresholds may be set and/or used by different KWS and other ASR systems. In some instances, any keyword corresponding to a confidence score (e.g., CA measurement) less than 100% may be determined to be underrepresented in the baseline training data.

Currently, in the illustrated example, the confidence scores are reported as CA percentages ranging from 0 to 100, where 0 represents 0% CA and 100 represents 100% CA (i.e., 100% of the utterances of the keyword were correctly accepted by a KWS system). An example of an underrepresented keyword 520 is shown by word 16, among others, based on the current confidence threshold 540 of 90%. Examples of keywords that have sufficient representation (e.g., keywords 510) in the baseline training data used to train a model configured for speech detection and/or speech recognition are shown, for example, word 19, among others, based on the current confidence threshold 540 of 90%.

It will be appreciated that the CA, FA, and FR can be measured on synthesized (TTS) and natural speech data, as well as a combination of both TTS and natural speech data.

In some embodiments, the disclosed embodiments of the present solution are used to improve the CA for low resource keywords using TTS data. In some examples, performance achievement of the model used in the KWS system is achieved for a particular keyword having a low training resource. As mentioned above, collecting more natural speech training data for a specific keyword is expensive in terms of resources to achieve the level of speaker diversity, data amounts, and performing post-processing simulations on the recorded data to achieve the quality of data needed to sufficiently supplement the baseline training data. In some instances, new TTS training data can be obtained by and used to modify an RNN-T model or other ASR model. For instance, with reference to FIG. 4, the act of modifying the trained RNN-T model with new TTS training data (act 450) is enabled by generating new TTS training data for one or specific keywords, such as a wake-up word or other function triggering keyword, such that the model is modified and/or adapted to be able to more accurately detect and accept the specific keyword(s) for which the new TTS training data was generated to perform the wake-up functionality or any other relevant functionality based on the detection of the keyword(s).

Generating TTS Data

Figure 6:
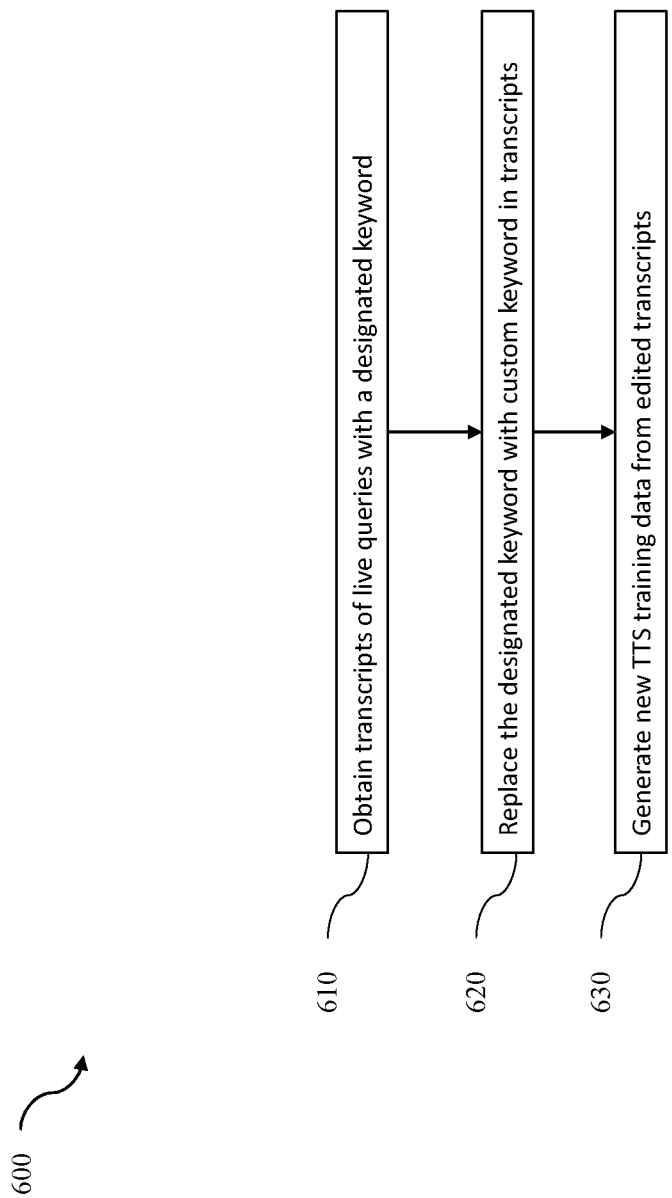
FIG. 6 illustrates a flowchart comprising acts associated with methods for obtaining new TTS training data for model modification.

Attention will now be directed to FIG. 6 which illustrates a flowchart 600 of acts associated with methods (e.g., method 600) for generating new TTS training data. These methods include, for example, a computing system such as a computing system 100 of FIG. 1. The computing system obtains transcripts of live queries with a designated keyword (act 610). In some embodiments, the new TTS training data corresponds to the new TTS training data 160 of FIG. 1. In some embodiments, the transcripts of live queries correspond to edited live query transcripts 736 of FIG. 7.

In some embodiments, the transcripts of live queries include transcribed text with a designated and/or previously utilized keyword at the beginning of each uttered phrase or segment of transcribed audio data. It is a best practice to anonymize and remove all personally identifiable information from the data before using it for generating TTS data. In some examples of obtaining transcripts of live queries, queries including an utterance of the designated keyword "Cortana" are selected. Only transcripts including only one utterance of the designated keyword "Cortana" are accepted. The transcripts are then cleaned by removing unwanted characters, such as non-ascii characters. Sometimes, there are several live queries that have repeated patterns, such as "Cortana call mom" and "Cortana call dad." In some embodiments, one query per repeated pattern is randomly picked while the rest of the queries are discarded. Since correct punctuation is important for a TTS system to get the correct prosody, the punctuation is reviewed and/or rectified for each query chosen (e.g., by using hand-crafted grammar rules). In some embodiments, a certain number (e.g., top 10k) of queries are selected based on their frequency of occurrence in the baseline training data.

Next, the computing system replaces the designated keyword with the custom keyword in the transcripts (act 620). In some embodiments, the custom keyword corresponds to the act (act 420) of method 400 in FIG. 4, where the custom keyword corresponds to "receive custom keyword." Additionally, or alternatively, the custom keyword corresponds to keyword 712 of FIG. 7 and/or keyword 940 of FIG. 9. For some examples, wherein "Cortana" is a designated keyword and "Olivia" is a custom keyword, a transcript including "Cortana call mom" is edited to be "Olivia call mom." Referring now to an act (act 630) such that after the computing system replaces the designated keyword with the custom keyword in the transcripts (act 620), the computing system generates new TTS training data from edited transcripts (act 630). In some embodiments, the edited transcripts now including the designated keyword replaced by the keyword (act 620), are input to a TTS system which outputs waveform and/or audio data corresponding to the edited transcripts. (See FIG. 7). In some embodiments, the new TTS training data that is generated from the edited transcripts corresponds to the new TTS training data 160 of FIG. 1 and/or other TTS data described herein. In some embodiments, this new TTS training data (see act 630) is the new TTS training data obtained in Method 300 (see act 310) and/or method 400 (see act 440).

Figure 7:
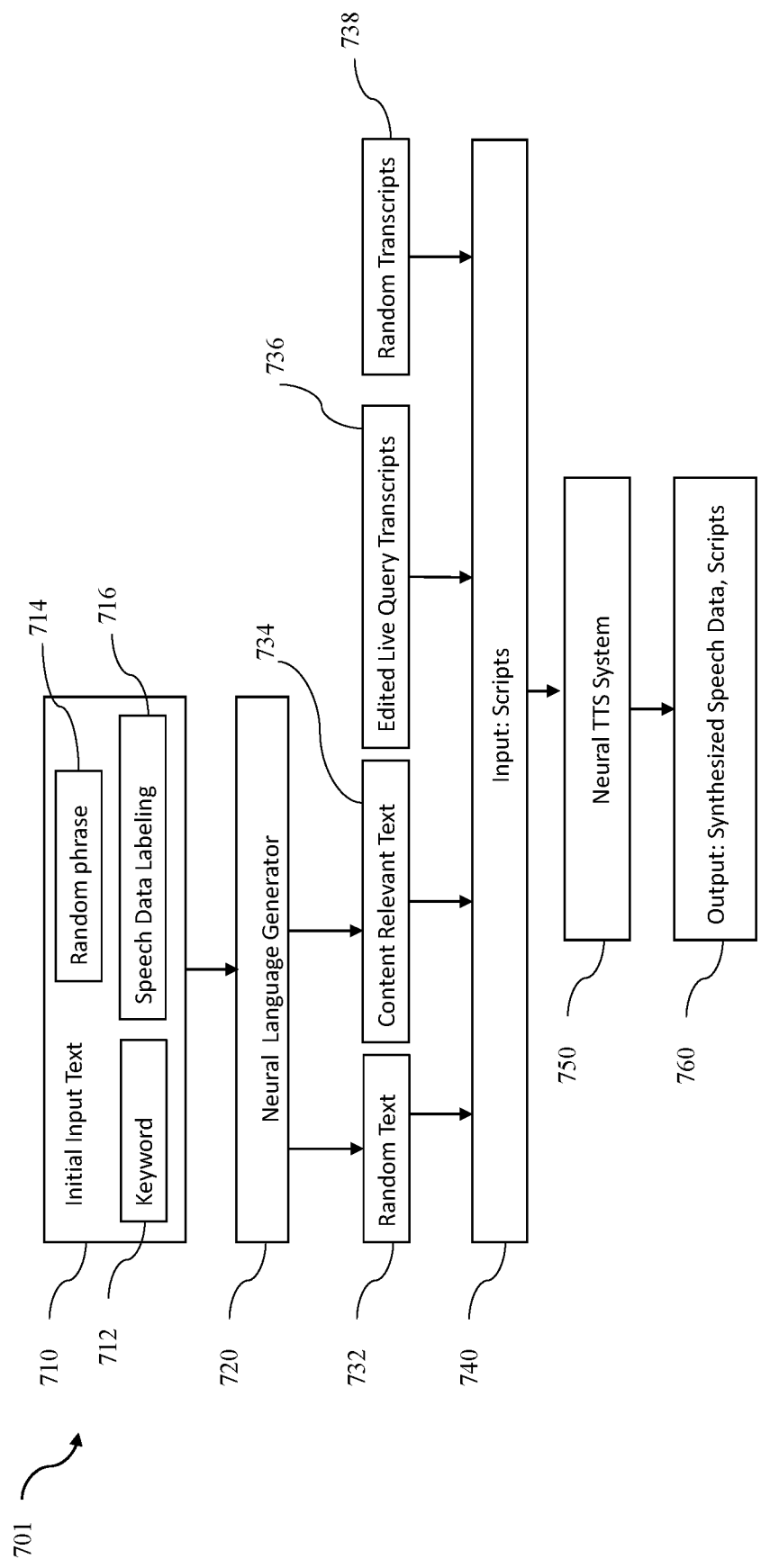
FIG. 7 illustrates a flowchart of different processes and components for generating and obtaining TTS training data is shown.

Referring now to FIG. 7, a flowchart of different processes for generating and obtaining TTS data is shown. The central component is shown as the neural TTS system 750 which is configured to receive an input including scripts 740 from various sources. In some embodiments, the neural TTS system 750 corresponds to the TTS system 950 of FIG. 9, the Neural TTS 1150 of FIG. 11, and/or Neural TTS 1250 of FIG. 12. The neural TTS system 750 generates audio, waveform, and/or synthesized speech data with the corresponding scripts 760. In some embodiments, the output 760 of synthesized speech data and a scripts corresponds to the New TTS training data 160 of FIG. 1, TTS data for keyword 960, TTS Speech, Scripts 1160 from FIG. 11, waveform 1274 of FIG. 12, and/or corresponding to methods described herein for obtaining new TTS training data (Method 301 of FIG. 3, Method 401 of FIG. 4, etc.).

The input scripts 740 can be generated from various sources, for example, random text 732, content relevant text 734, edited live query transcripts 736 (see Method 601 of FIG. 6), random transcripts 730, and/or other suitable source of transcribed audio or text-based communication. Random transcripts 730 can be obtained from transcribing audio data from various sources including television shows, podcasts, movies, and/or radio talk shows, etc. Additionally, or alternatively, random transcripts 730 are obtained from books, newspapers, magazines, blogs, and/or webpages, etc. In some embodiments, a neural language generator (NLG) 720 is used to generate the random text 732 and/or content relevant text 734. The NLG 720 is configured to receive an initial text input 710 including a keyword 712, a random phrase 714, and/or speech data labeling 716. In some embodiments, the NLG 720 may correspond to the neural network language model (NNLM) 1140 of FIG. 11, for example. In some embodiments the keyword 712 corresponds to keyword 940 of FIG. 9. and/or the custom keyword received in act 420 of Method 401 of FIG. 4. In some embodiments, the speech data labeling 716 corresponds to label 1122 of FIG. 11.

In some embodiments, the NLG 720 is configured as an LSTM language model with corresponding beam search algorithm to generate content relevant target text. For example, each sentence and/or phrase (i.e., keyword 712, speech data labeling 716) is provided as a prompt to the NLG to generate various continuations of the prompts. Diversity constraints are applied during the beam search including penalizing repeated tokens, restricting the number of beams that end with the same bigram, and preventing n-gram repetitions within a beam. In some embodiments, the language model has a vocabulary size of 59K BPE tokens and three LTSM layers, with a total of 220M parameters. The NLG 720 is typically trained to convergence on 3B words of paragraph level data retrieved from web-crawling.

The NLG 720 is able to generate complete sentences, phrases, words, word-pairs, and/or other phoneme sequences from a target text input to generate content-relevant text. Random text 732 refers to text that used a random phrase 714 or random input text for the NLG 720. Content relevant text 734 refers to text generated by the NLG 720 that pertains to a certain topic or type of speech and/or is personalized to a speaker's typical vocabulary and topics of conversation or typical speech commands. For example, text generated by the NLG 720 from a keyword 712 input is considered content relevant text 734 because the text generated as output is relevant or pertains to the keyword (i.e., it generates text that would typically use the keyword 712). The output random text 732 or content relevant text 734 can then be used to generate synthesized speech data 760 from the Neural TTS System 750.

In some embodiments, the synthesized speech data 760 comprises TTS data from 320 speakers. For example, audio is generated for transcripts of 10K queries per speaker, allowing the collection of 150K utterances (in some embodiments, 150K utterances per keyword 712). The TTS data is passed through data simulation and pre-processing steps, which in some embodiments, doubles the amount of utterances per keyword 712.

To illustrate an example of how text is generated as output from the NLG 760, see the following example:
The system receives Input:
AND YOU HAVE TO DO A LOT OF COMPUTATION THERE
The system uses data simulation to generate numerous relevant Outputs:
AND YOU HAVE TO DO A LOT OF COMPUTATION THERE IF YOU WANT TO.
AND YOU HAVE TO DO A LOT OF COMPUTATION THERE IF YOU'D LIKE TO LEARN MORE.
AND YOU HAVE TO DO A LOT OF COMPUTATION THERE IN ORDER FOR IT TO WORK PROPERLY.
Etc. . . . .

Improving Confidence Score Logic with TTS Data

The device modeling technology underlying some custom keyword services is an RNN-T model trained with tens of thousands of hours of keyword-independent data. During a decoding process to determine if a keyword is detected in a speech command received as input to the model, to customize the system for the keyword, a decoding graph is constructed for the keyword. Paths in the graph correspond to its pronunciations. Application of a standard beam search to decode the graph results in a decoding score or confidence score for the keyword. The confidence score is compared to a predefined threshold to decide whether the keyword is detected in the speech command. Typically, a predefined threshold is shared among all keywords. However, during evaluation of the models for keyword customization, it was found the decoding or confidence scores' distribution varies keyword to keyword. Thus, it is not practical to use a keyword-independent global confidence threshold as part of the logic gate that compares the keyword dependent computed confidence score to the global threshold to determine whether the keyword is detected in the speech command.

Figure 8:
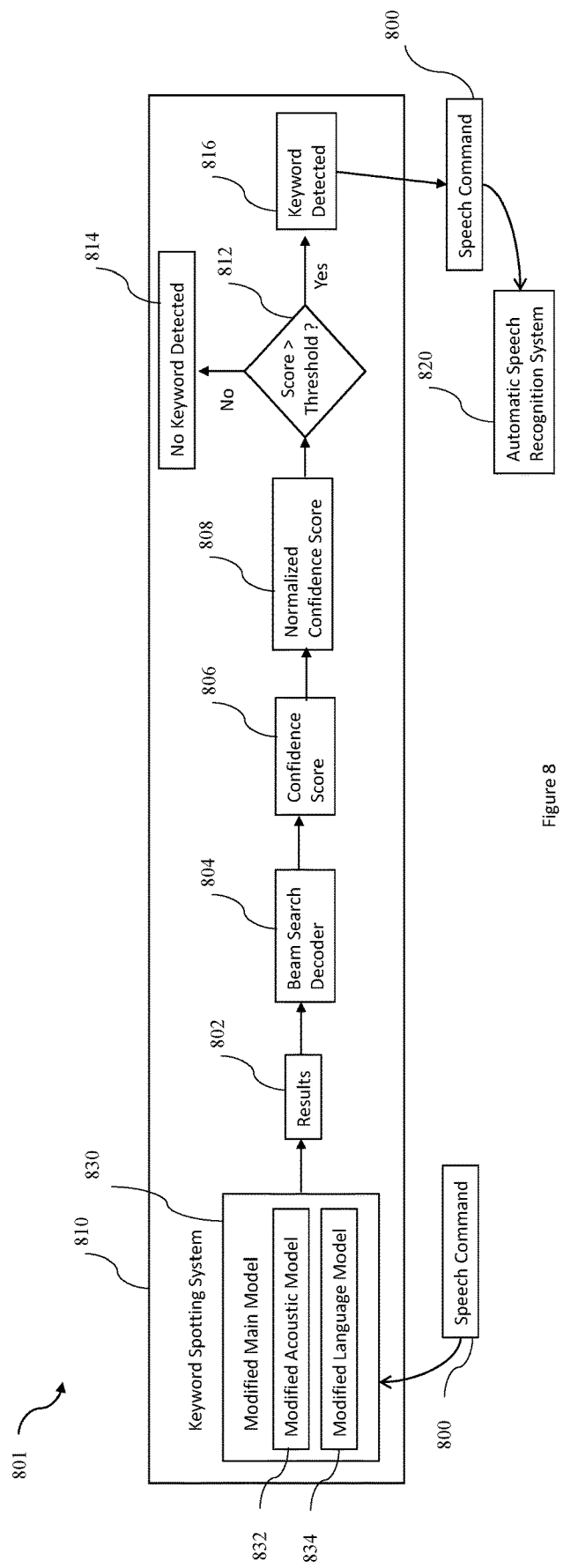
FIG. 8 illustrates a flowchart of different processes and components for detecting a keyword in a speech command using the modified main model of FIG. 1.

Referring now to FIG. 8, a process flow diagram 801 is shown, which includes processes and components associated with methods for detecting one or more keyword(s) (see logic gate 812) in a speech command 800 using a keyword spotting system 810. The keyword spotting system 810 includes a modified main model 830 comprising a modified acoustic model 832 and modified language model 834. In some embodiments, the modified main model 830 corresponds to the modified main model 120 of FIG. 1. A speech command 800 potentially containing a keyword is analyzed by the modified main model 830. The results 802 are sent to a beam search decoder 804.

In some embodiments, the beam search decoder 804 determines the likelihood that audio features corresponding to the speech command 800 received by the modified acoustic model 832 correspond to an utterance of the keyword. In some embodiments, the beam search decoder 804 implements a heuristic search algorithm that explores a graph by expanding the most promising node in a limited set. In some embodiments, only a predetermined number of best partial solutions are kept as candidates by the beam search decoder 804. Additionally, or alternatively, the beam search decoder 804 is configured as a token-passing decoder operating on a graph of possible pronunciations.

In some instances, a confidence score 806 is computed for the keyword where the confidence score 806 represents the likelihood or a probability that the speech command 800 includes the keyword. In some embodiments, the confidence score 806 is normalized to a global confidence score threshold resulting in a normalized confidence score 808 for the keyword. This normalized confidence score 808 is compared to a global confidence threshold (see logic gate 812) to determine that the keyword is detected (see keyword detected 816 in the case that the normalized confidence score exceeds the global confidence score threshold) or to determine that no keyword is detected (see no keyword detected 814 in the case that the normalized confidence score does not exceed the global confidence score threshold). In some embodiments, the confidence threshold is defined by a user. In some embodiments, the confidence threshold is determined by a computing system, machine learning model, or other rules-based determination.

In some embodiments, the determination that the keyword is detected (see keyword detected 816) causes the speech command 800 to be sent to an automatic speech recognition (ASR) 820 system. In some embodiments, the detection or acceptance of a keyword within a speech command 800 activates a speech-enabled device wherein an ASR system 820 is housed along with the KWS system. The ASR system 820 is configured to interpret the speech command and determine a service or action to be performed (e.g. by a virtual personal assistant) housed in the speech-enabled device. For example, in embodiments where "Olivia" is a keyword used to "wake up" or activate the speech-enabled device, the KWS system 810 receives a speech command 800 such as "Olivia, call mom." In the case that the KWS system 810 correctly detects the keyword (see item 816), the speech command 800 for "Olivia, call mom" is sent to the ASR system 820. The ASR system 820 then analyzes the speech command 800 and determines that the virtual assistant housed on the speech-enabled device is to "call mom" (i.e., access a user's contacts, select the contact "mom," and dial a phone number associated with the contact "mom".

In some embodiments the KWS system 810 and ASR system 820 are separate systems. In some embodiments, the KWS system 810 and ASR system 820 are combined systems that utilize the same modified main model 830. In some embodiments, a trained main model corresponding to the trained main model 120 of FIG. 1 is used instead of the modified main model 830.

In some embodiments, the confidence score 806 is compared to a keyword-dependent confidence score threshold instead of a global confidence score threshold to determine that a keyword is detected (see logic gate 812) in the speech command 800. The global confidence score threshold is defined to be keyword independent. The global confidence score scale by which a keyword dependent computed confidence score is normalized is based on a normalization of a plurality of confidence scores computed for a plurality of different keywords.

In embodiments including a global confidence score threshold and embodiments including a keyword-dependent confidence score threshold, two evaluation data sets are typically used. The first set includes the keyword utterances to determine a keyword recall rate (CA score) of a given threshold. The second set includes utterances including no keyword utterances to determine a keyword false alarm rate (FA score).

In some instances, the KWS system 810 includes a high CA score and a low FA for any given keyword. The confidence score thresholds (global and/or keyword-dependent) are predefined. If the confidence score threshold is raised, the FA score lowers, sometimes at the expense of a lower CA score (e.g., keywords that are accepted will generally be classified as correctly accepted keywords but some keywords that were actually in the speech command 800 were falsely rejected because they did not meet the high value defined by the threshold). If the confidence score threshold is lowered, a higher number of keywords will be detected and accepted, but sometimes this will increase the FA score where a keyword is determined to be detected but was not actually included in the speech command 800.

The first set is usually costly to collect in terms of time and money because large numbers of utterances must be recorded from a large number of diverse speakers to ensure that a detection of the keyword occurs correctly on a speaker-independent KWS system 810. (In some embodiments, the KWS system 810 and/or ASR system 820 is personalized to a speaker. In some embodiments, the KWS system 810 and/or ASR system 820 is trained to be speaker independent.)

The disclosed embodiments are directed to generating and using TTS data to augment, supplement and/or replace a portion or all of the first data set including utterances of the keyword. In some embodiments, the model used in the KWS and/or ASR systems is modified by TTS data (see modified main model 830). Thus, the TTS data used in the adaptation and the TTS data used in the evaluation of the model is configured to be disjoint to remove bias of the evaluation of the model. In some embodiments, a number of speakers (e.g., 320 speakers) associated with a multi-speaker neural TTS system is separated by an 80:20 ratio, with 80% of the speakers used to generate audio or synthesized speech data for the model adaptation or for modifying the model and 20% of the speakers used to generate audio or synthesized speech data for evaluation. In some embodiments, the content of the transcripts used to generate the synthesized speech data is also divided between the model adaptation and model evaluation tasks. In some embodiments, different TTS systems are used to generate the data for adaptation and evaluation tasks. For example, a neural TTS system can be used for adaptation data generation and a statistic parametric speech synthesis system or a unit concatenation system can be used to generate data for evaluation.

Using TTS Data for Pronunciation Learning

As described above, during decoding, a decoding graph is constructed for a particular keyword (e.g., for a keyword that is underrepresented in training data used to train a model or other keyword chosen by a user). The aforementioned decoding procedure includes several limitations. First, the pronunciations used in the decoding may not be accurate for some keywords. In some systems, the pronunciation is generated via a dictionary look-up or a look-up table (LUT). If the keyword is not found in the dictionary or LUT, a letter-to-sound model can be employed to generate the pronunciation. However, if the keyword is rare (an underrepresented keyword) and its pronunciation is not found in the dictionary, the letter-to-sound model may fail to give an accurate pronunciation. Even if the correct canonical pronunciation can be obtained via the letter-to-sound model, a user may pronounce the keyword in a non-canonical way (e.g., the user speaks with an accent and/or the use speaks at a fast speaking rate that is difficult for the model to detect and consider some phonemes in the keyword as it is spoken).

The disclosed embodiments are directed to generating and using TTS data to learn the pronunciation directly. In some embodiments, the model used for keyword detection does not have to be retrained on the TTS data to be effective in correctly identifying keywords in speech commands.

Figure 9:
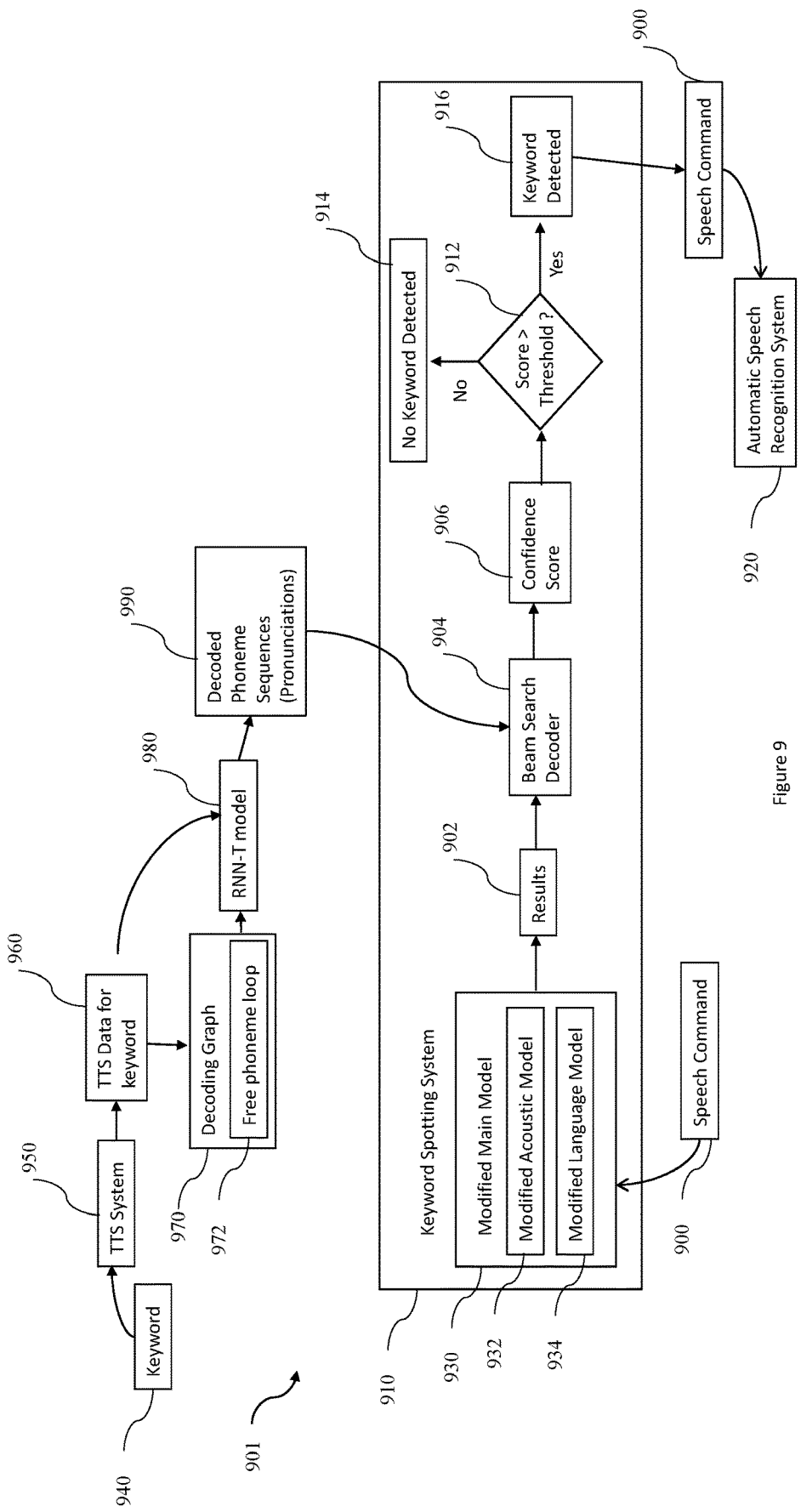
FIG. 9 illustrates a flowchart of different processes and components for detecting a keyword in a speech command with pronunciation learning based on new TTS training data.

Referring now to FIG. 9, a keyword spotting system 910 is shown including a modified main model 930. In some embodiments, the keyword spotting system 910 corresponds to the keyword spotting system 810 of FIG. 8. The modified main model 930 includes a modified acoustic model 932 and a modified language model 934. In some embodiments, the modified main model 930 corresponds to the modified main model 830 of FIG. 8. A speech command 900 potentially including a keyword is received by the modified main model 930. In some embodiments, the speech command 900 corresponds to a speech command represented by speech command 800 in FIG. 8. Results 902 from the modified main model 930 are sent to a beam search decoder 904, where in some embodiments, the results 902 correspond to results 802 of FIG. 8 and the beam search decoder 904 corresponds to the beam search decoder4 804 of FIG. 8.

In some embodiments, a keyword 940 designated as a target keyword (the keyword potentially included in the speech command 900) is received by a TTS system 950. In some embodiments, the TTS system 950 corresponds to a TTS system represented by TTS system 150 of FIG. 1, Neural TTS System 750 of FIG. 7, neural TTS 1150 of FIG. 11, and/or neural TTS 1250 of FIG. 12. Returning back to FIG. 9, keyword dependent TTS data 960 is generated by the TTS system 950. A decoding graph 970 is constructed from the TTS data 960 for the keyword. The decoding graph 970 includes at least one free phoneme loop 972 (see FIG. 10). A computing system as described herein decodes the phoneme sequences from the free phoneme loop using an RNN-T model 980 and the TTS data 960. In some embodiments, the computing system corresponds to computing system 100 of FIG. 1. In some embodiments, the main model corresponds to main model 110, trained main model 120, or modified main model 130.

The decoded phoneme sequences 990 correspond to pronunciations of the keyword. Once the sequences are decoded, the computing system performs pronunciations voting and selection based on frequency count and adds the selected pronunciations of the keyword to a base or main decoding graph for the keyword.

The beam search decoder 904 uses results from the modified main model 930 and the decoding graph 970, The decoding graph 970 is constructed by the pronunciations of the keywords, which consists of the decoded phoneme sequences from the above pronunciation learning step and/or to which the canonical pronunciation is added from the dictions. The confidence score 906 represents a probability or likelihood that the speech command 900 includes the keyword 940. The confidence score 906 is compared to a confidence score threshold (see logic gate 912). A keyword is detected (see item 916) when the confidence score 906 exceeds the predefined threshold. A keyword is not detected (see item 914) when the confidence score 906 does not exceed the predefined threshold.

In some embodiments, the confidence score 906 corresponds to the confidence score 806 of FIG. 8 and is further normalized to a global confidence score scale. Thus, in some embodiments, confidence score 906 is a normalized confidence score. In some embodiments, the logic gate 912 corresponds to the logic gate 812 of FIG. 8 where the threshold is configured as a global threshold or a keyword-dependent threshold. In some embodiments, pronunciation learning for a keyword using TTS data does not require retraining of a model and can utilize a generical acoustic model. Thus, latency is reduced between receiving a custom keyword and generating a custom keyword model used in KWS. This model can be further compressed by SVD and quantized (e.g., to 8 bits, 16 bits, or the like, per weight) to run on low-power hardware. In some embodiments, the modified acoustic model 932 is compressed via NN layer quantization, frame skipping, frame stacking, SVD, and/or frame batching. An acoustic model can be used in conjunction with a background language model (BLM). In some embodiments, the modified acoustic model 932 is configured to receive audio features and produce a series of probability vectors in which the audio features correspond to phonemes.

It is anticipated that the KWS system 810 or 910 can be deployed on many types of speech-enabled devices including laptops, computers, terminals, mobile phones, tablets, smart watches, digital music players, servers, smart speakers, and/or virtual personal assistant devices. A user including a human user and/or a computer user can generate the speech command 900.

Figure 10A:
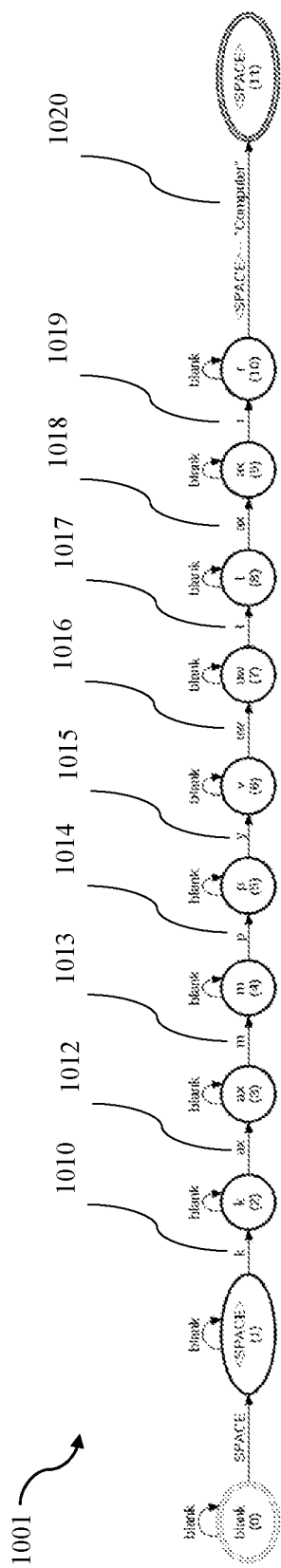
FIG. 10a illustrates an example of a decoding graph with a possible pronunciation of a keyword.

FIG. 10*a* illustrates one example of a decoding graph 1001 with a pronunciation of a keyword, for example "computer". In some embodiments, the decoding graph 1001 corresponds to decoded phoneme sequences 990 of FIG. 9. The keyword "computer" can have several different pronunciations. An audio is deconstructed into individual phonemes which are analyzed in series. A phoneme sequence is decoded from the free phoneme loop corresponding to one pronunciation of the keyword "computer". Phoneme "k" extracted from the audio (see k 1010) is determined to correspond to pronunciation k (2). Phoneme "ax" 1012 is determined to correspond to pronunciation ax (3). The phoneme sequence is decoded similarly for phonemes 1010, 1011, 1012, 1013, 1014, 1015, 1016, 1017, 1018 and 1019 culminating in a pronunciation for computer 1020 which is used to determine if the keyword "computer" is detected in the audio of a speech command for a keyword spotting system. In some embodiments, the decoding graph begins with a blank (0) phoneme so that the keyword is detected only following silence or as uttered at a beginning of phrase.

Figure 10B:
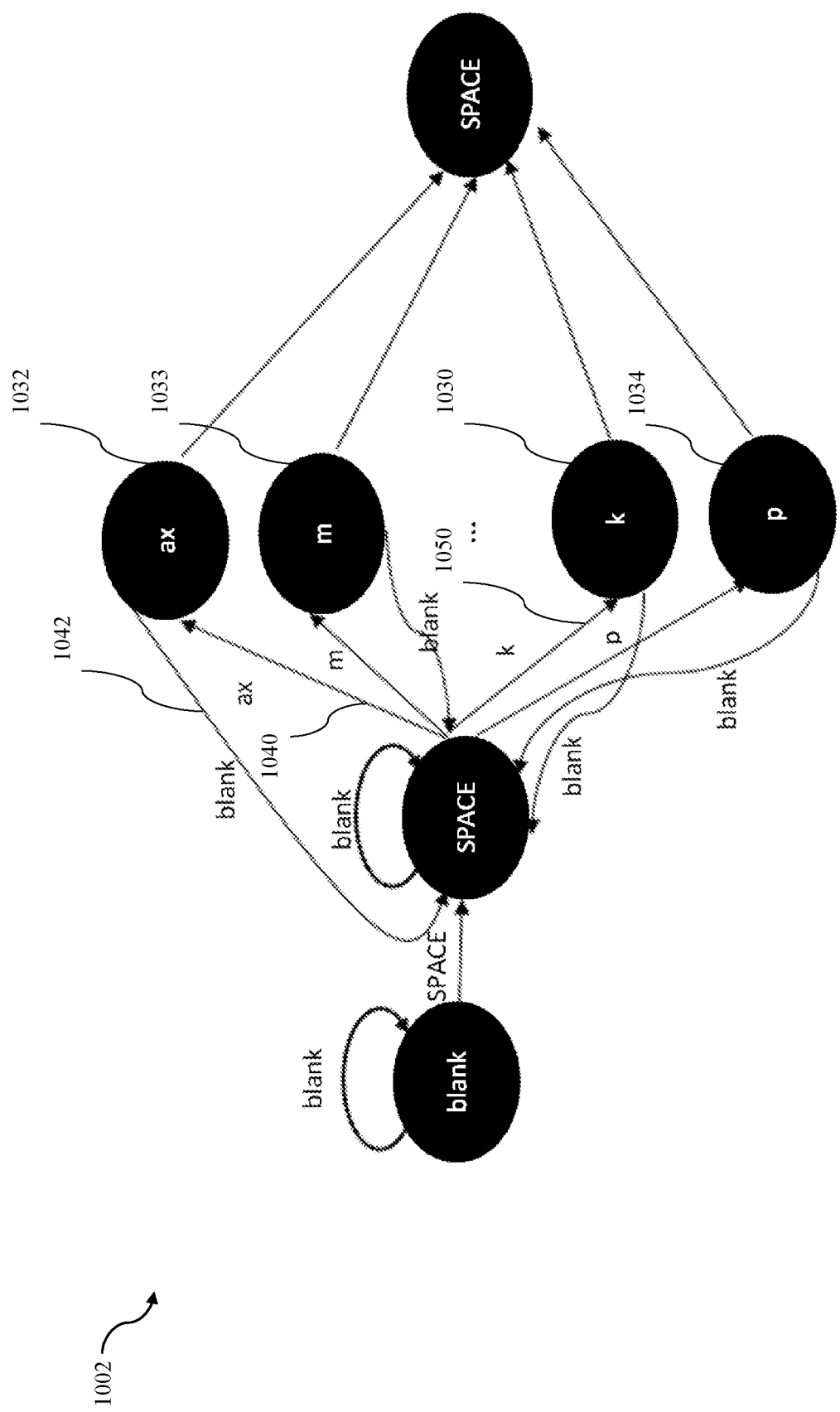
FIG. 10b illustrates an example of a free phoneme loop.

FIG. 10*b* illustrates one example of a free phoneme loop 1002. In some embodiments, free phoneme loop 1002 corresponds to free phoneme loop 972 in decoding graph 970 of FIG. 9. FIG. 10*b* illustrates the free phoneme loop 1002 which is shown with parallel paths (e.g., paths 1040, 1050) in the loop which each represent an English phoneme. Each phoneme (e.g., 1030, 1032, 1033, 1034) is allowed to "jump" to any other phoneme with a jump-back loop (e.g., path 1042). Thus, this loop or graph is allowed to generate any phoneme sequence wherein the free phoneme loop shown is an example embodiment. In some instances, weights and/or constraints are imposed on parts or all of the graph. During decoding, given the audio containing a keyword as input, the graph will generate the most matched phoneme sequence of the keyword. For example, for the keyword "computer," the decoding phoneme sequence may be determined to be "k-ax-m-p-y-uw-t-ax-r," In some embodiments, this decoding phoneme sequence corresponds to the decoded phoneme sequences 990 of FIG. 9.

Personalized TTS Data Generation

Figure 11:
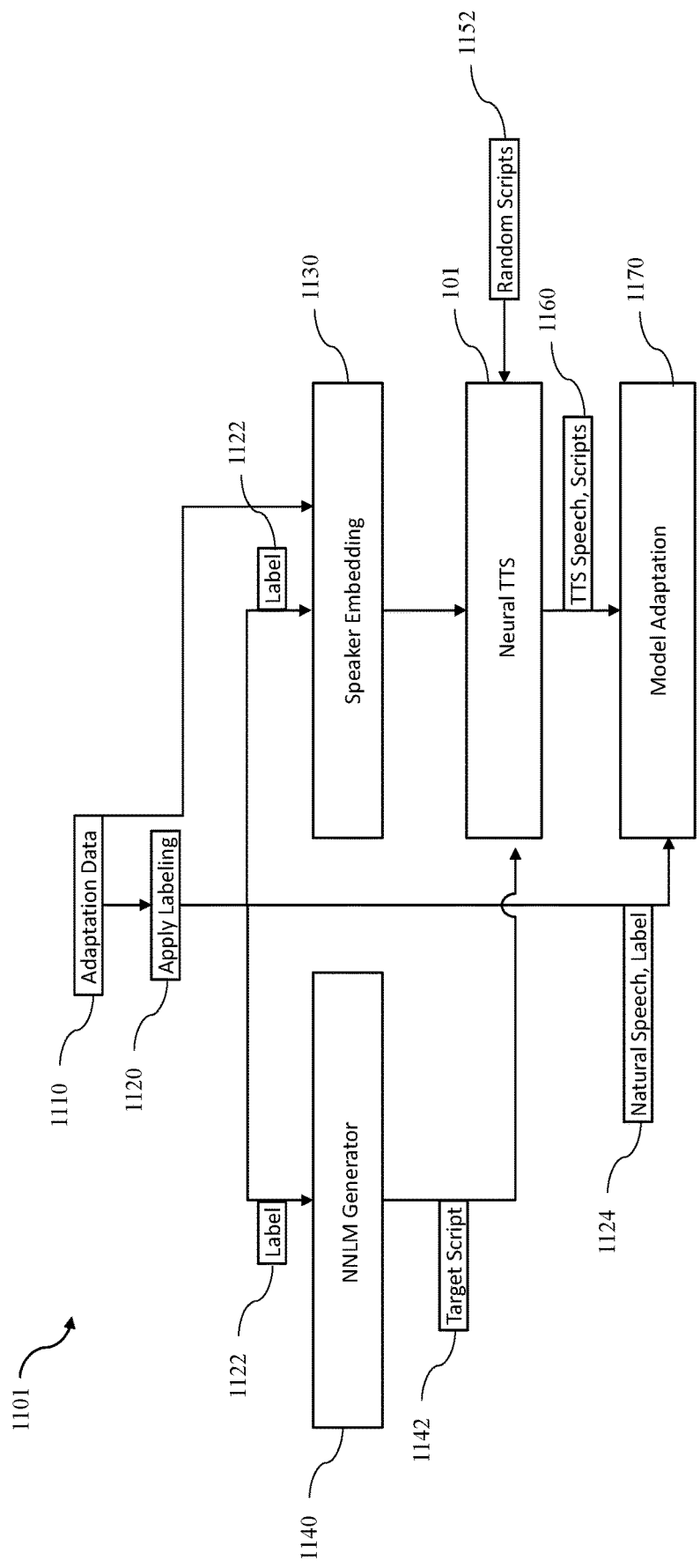
FIG. 11 illustrates a flowchart of different processes and components for training a neural TTS system used to generated new TTS training data for model adaptation.

Referring now to FIG. 11, a system architecture 1101 is shown for model adaptation using a neural network language model (NNLM) generator 1140, speaker embedding 1130, and Neural TTS system 1150. In some embodiments, the NNLM generator 1140 corresponds to the NLG 720 of FIG. 7, the speaker embedding 1130 corresponds to speaker embedding 1220 of FIG. 12, and/or the Neural TTS system 1150 corresponds to the Neural TTS 1250 of FIG. 12, TTS system 950 of FIG. 9 and/or the TTS system 150 of FIG. 1.

Adaptation data 1110 is provided for a particular speaker. For applications in rapid speaker adaptation this adaptation data 1140 includes 1 to 10 minutes (or another amount) of natural speech data recorded from the particular speaker. A labeling is applied (see apply labeling 1120) wherein the labeling or shortened label 1122 is used as input to the NNLM generator 1140. The labeling can be applied via human transcription of the adaptation data or via a first-pass decoding of a model. The NNLM generator 1140 outputs target script 1142 from the label 1122 corresponding to the adaptation data 1110. In some embodiments, the label 1122 corresponds to the speech data labeling 716 of FIG. 6 and the target script 1142 corresponds to the content relevant text 734 of FIG. 7. The Neural TTS 1150 uses the target script 1142 to generate TTS speech and scripts 1160. In some embodiments, natural speech and corresponding labels 1124 from the adaptation data 1110 are mixed with the TTS speech and corresponding scripts 1160 to be used as training data for model adaptation 1170.

Where labeling 716 from the adaptation data is used as input to the NNLM generator 1140, the target script 1142 is content relevant text that is personalized to the particular speaker because it contains content themes, topics, vocabulary, and general vernacular (e.g., phonemes and/or phoneme sequences) typically used by the particular speaker. In some instances, the labeling 716 corresponds to graphemes, phoneme sequences, word pieces, and/or word sequences from the adaptation data.

In some embodiments, the neural TTS 1150 is personalized (i.e., adapted to a new speaker) wherein the neural TTS 1150 generates TTS speech and scripts 1160 from the speaker embedding 1130 and label 1122 from the adaptation data 1110. Additionally, or alternatively, random scripts 1152 from random conversational text is used as the text input for the neural TTS 1150 to generate TTS speech and scripts 1160. The speaker embedding 1130 is configured to extract speaker data from a speaker latent space. In some embodiments, the speaker latent space is associated with baseline training data used to train a seed model used in keyword spotting or speech recognition applications, for example, in rapid speaker adaptation of the seed model for a particular speaker.

In some embodiments, regarding the model adaptation 1170, a Kullback-Leibler (KL)-divergence regularized model adaptation is adopted for baseline training to prevent catastrophic forgetting and overfitting. For the adaptation structure, different components of the original model or additional sub-space speaker-specific network components are compared. The linear projection layer sub-net adaptation yields more competitive performance when compared to a standard model adaptation without KL-divergence regularization.

In some embodiments, the baseline model is a bi-directional LSTM trained from tens of thousands of hours of speech. In some embodiments, the model has six bi-directional LSTM layers followed by a fully connected top layer. Each layer can have up to 2048 hidden units or more. The input can be an 80-dim log-filter bank feature, for example. The output layer can have 10K senone states. In some embodiments, the speaker adaptation task consists of six speakers (three native and three non-native), each with 10 minutes (or another amount) of adaptation data for training and 20 minutes (or more or less) of data for testing. It should be appreciated that the speaker adaptation task can consist of any number of speakers, having any ratio of native to non-native speakers. Also, the amount of data used for training and testing will also vary in some embodiments.

In some embodiments, a KL-regularized sub-net adaptation is foregone, and overfitting is avoided by combining synthesized personalized speech with the original speech. It should be appreciated that different amounts of synthesized speech are combined with different amounts of original speech, in various embodiments, to accommodate different needs and preferences for different desired adaptation tasks. For example, in some embodiments, the original speech is weighted by a predetermined factor (e.g., original speech is weighted by 10 or 5 (or another amount), such as for 1 minute and 10 minute (or other amount) of original adaptation data, respectively). In some embodiments, only synthesized speech is used for model adaptation. In some embodiments, after TTS data (i.e., synthesized speech data) is generated, data selection and/or data filtering is employed based on the quality of synthesized speech data.

Data sparsity is a major barrier in rapid speaker adaptation. Adaptation with extremely small amounts of data tends to result in overfitting of the model to the adaptation data 1110. In some embodiments, adaptation data 1110 is augmented with noise and speaking rate perturbation. However, data simulations like noise and speaker rate perturbation do not overcome the limitation of limited phonetic coverage in adaptation data 1110 (where adaptation data 1110 is less than 10 minutes of speaker data). Utilizing personalized synthesized speech can flexibly generate arbitrary speech (see TTS data, scripts 1160) with rich phonetic coverage including relevant content (see target script 1142).

Example TTS Systems

A TTS system usually consists of components that operate in two stages. First, a front end or text analysis which converts input text into a representation of a pronunciation (e.g., a phoneme sequence, essentially what the system is to say) and other linguistic information to describe the corresponding prosody (e.g., information to tell the system how to say the text). Secondly, a backend or synthesizer converts the linguistic information output from the front end into speech data.

The front end includes many natural language processing (NLP) components including a sentence and word breaker, text normalization, POS tagger, pronunciation model (lexicon), prosody predictor, among other components. In some embodiments, a rule-based and machine-learning based methods are used.

The backend can be categorized into two parts. First, a statistic parametric speech synthesis is used in which an acoustic model firstly predicts an acoustic contour (spectrum and excitation) for given linguistic information. A vocoder is used to synthesize speech where the vocoder essentially simulates the production process of natural human speech. Second, a unit concatenation system is used in which a recording corpus of training data is split into small segments or units. The best units are found according to input linguistic information, and the system concatenates the units to form a speech fragment. Acoustic models are used to guide the unit selection by considering both the target cost and the concatenation cost along with signal processing modules to reduce the discontinuity between successive units. Some models used in the include the DNN, LSTM, and HMM-GMM models.

Although TTS systems as described above achieve intelligibility and good naturalness of speech, the gap between synthesized speech and natural human speech is still significant in terms of sound quality (clearance and fidelity) and prosody naturalness. Parametric speech synthesis typically suffers from over-smoothing in the acoustic model and is characterized with "buzzle effects" in the vocoding stage. Unit concatenation systems introduce discontinuity even with a very large recording corpus of training data and can lead to the so-called "shakiness" in the synthesized speech. Current TTS systems require predefined prosody schema, manual labeling for model training, and separated prosody prediction and realization which lead to the gap in naturalness for prosody in synthesized speech as compared to natural human speech. Also, the fragmented engineering process leads to heavy development costs.

To overcome the limitations in conventional TTS systems, disclosed embodiments include or utilize a neural TTS system. Because TTS is an application of a sequence to sequence mapping problem (e.g., input text to speech waveform), it is possible to use a neural network (NN) to model the sequence mapping more powerfully and directly. First, in some embodiments for waveform generation, dilated convolution networks are cascaded to model the long sequence of speech samples in an autoregression. The NNs employ skipping and residual connection with rich non-linearity along with an objective function to simulate the real speech distribution.

Figure 12:
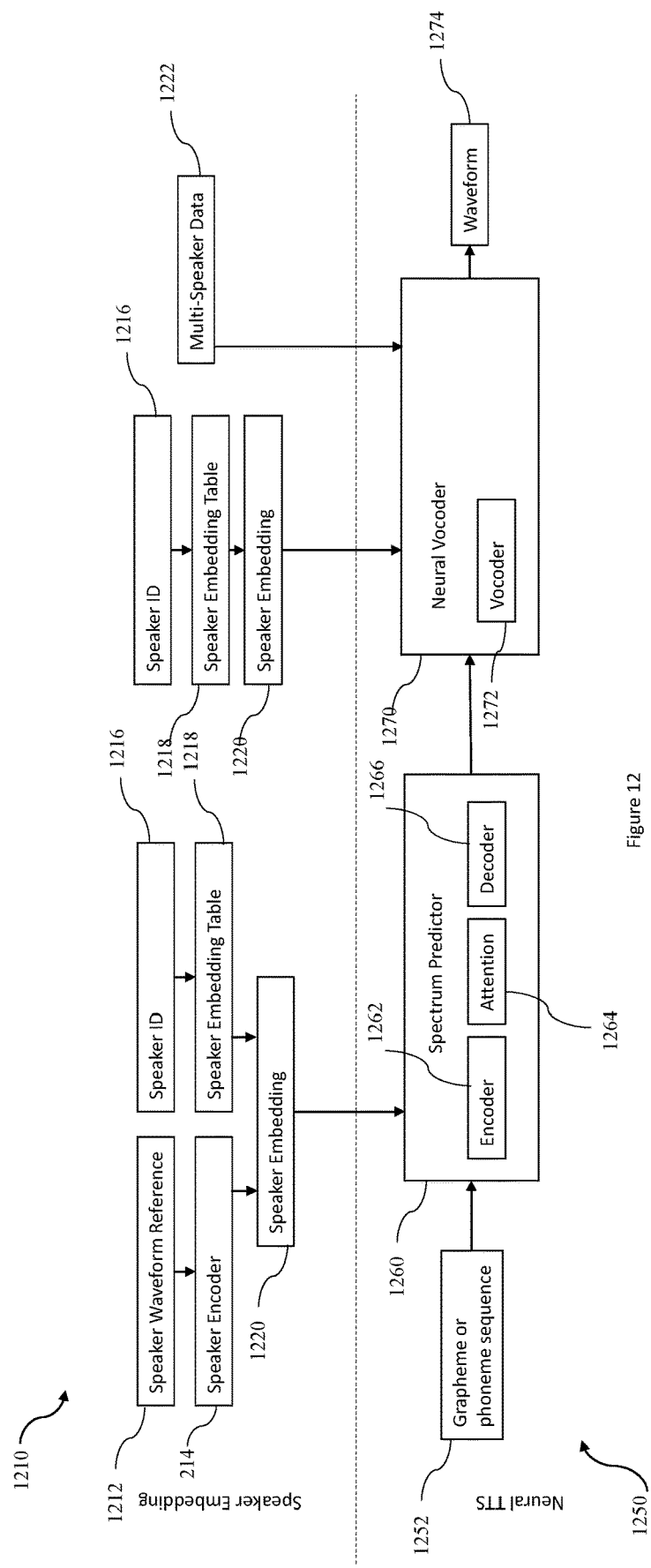
FIG. 12 illustrates a detailed flowchart of different processes and components for training a neural TTS system used to generate new TTS training data for various speech recognition applications.

Referring to FIG. 12, a system for a Neural TTS 1250 is shown as part of a process flow diagram having different processes and components for utilizing speaker embedding 1220 to train a Neural TTS 1250. The Neural TTS 1250 is shown including a spectrum predictor 1260 with an encoder 1262, decoder 1266 and attention 1264. Also shown is the Neural Vocoder 1270 having a vocoder 1272 unit. Data comprising graphemes or phoneme sequences 1252 is fed as input to the spectrum predictor which converts the input text into Mel-spectral data. This is then input to the Neural Vocoder 1270 which generates the waveform conditioning on the Mel spectral data. The output of the Neural Vocoder is speech waveform 1274 data. In some embodiments, the Neural Vocoder is a WaveNet vocoder.

Speaker embedding 1220 is introduced to pool multi-speaker data during training for efficient generation of personalized speech for new speakers. In some embodiments, the multi-speaker data includes at least 30 professional en-US speakers and more than 200 hours of phonetic-rich recordings to train the model. In some embodiments, this multi-speaker data corresponds to the non-synthesized speaker data 140 of FIG. 1. The spectrum predictor 1260 is adapted to each target speaker given some registration data (e.g., speaker waveform reference 1212 or Speaker ID 1216). Where a speaker waveform reference 1212 is obtained, a speaker encoder 1214 acts to encode the speaker waveform reference 1212 into the speaker embedding 1220 to adapt the spectrum predictor 1260 to the speaker. Where a speaker ID 1216 is obtained, a speaker embedding table 1218 is utilized to configure the speaker embedding 1220 with the speaker information from the speaker embedding table 1218 to adapt the spectrum predictor 1260 to the speaker identified by the speaker ID 1216. In some embodiments, the neural vocoder 1270 is a universal WaveNet model trained with the same corpus of multi-speaker data without adaptation.

Both the front end and acoustic model are jointly modeled by an encoder 1262-decoder 1266 architecture with attention 1264 mechanism which is very similar to a neural machine translation system. The spectrum predictor 1260 can treat the task as a translation task from text (e.g., grapheme or phoneme sequences 1252) to a spectrum representation of speech.

In view of this disclosure, it will be appreciated that the use of an RNN-T/LSTM based encoder-decoder, in the manner described, facilitates improvement in acoustic prediction to include more natural prosody than conventional TTS systems. For instance, in this framework for the spectrum predictor 1260 and corresponding Neural TTS 1250, a predefined prosody schema is not required and the prosody prediction (duration and pitch contour) are jointed with spectrum prediction in an end-to-end model with a single objective function. Furthermore, by combining the spectrum predictor 1260 and the neural vocoder 1270, the Neural TTS 1250 is enabled to overcome limitations of traditional TTS systems and methods by providing high-quality synthesized speech that reaches intelligibility and naturalness levels close to that of recorded natural human speech.

Additionally, utilizing a limited amount of adaptation data (see adaptation data 1110 of FIG. 11), the Neural TTS 1150 can be personalized to the acoustic and language features (sound and content) of a speaker's speech, as described. By repeating this process, the neural TTS 1150 is configured as a multi-speaker neural TTS system which can generate synthesized speech for a large number of speakers and for providing large quantities of TTS training data.

Pseudo-Supervised Model Training

Typically, model training can be categorized into two categories: supervised training and unsupervised training. Returning to FIG. 11, depending on the type of labeling that is applied (see apply labeling 1120), the model adaptation 1170 is categorized as unsupervised or supervised training. Where the label 1122 is generated from human transcription of the adaptation data 1110, the model adaptation 1170 corresponds to supervised training. Where the label 1122 is generated from a first pass decoding, the model adaptation 1170 corresponds to unsupervised training. Imperfect supervision is a fundamental challenge of unsupervised adaptation.

The disclosed embodiments include systems, devices, and methods for modifying the consumption of the unlabeled speech for model adaptation 1170. Instead of directly using the unlabeled speech for adaptation (e.g., adaptation data 1110 as the only input 1124 to model adaptation 1170), the adaptation data 1110 is used to train the speaker embedding 1130 for personalized speech synthesis. Possible transcription errors, such as errors introduced via the first pass decoding, may occur during the speaker embedding 1130. However, these errors are not translated into an explicit error in the synthesized speech. Instead, any errors are rendered as perceptible or imperceptible minor speech distortions which will not result in catastrophe gradient update or overfitting during model adaptation 1170.

It will be appreciated that the disclosed embodiments related to generating and using TTS data for personalizing a neural TTS system offer many benefits, including the following benefits: First, they relieve the general data sparsity issue in rapid adaptation by making use of additional synthesized speech. Second, they circumvent the obstacle of an explicit labeling error in unsupervised adaptation by converting the training to a pseudo-supervised training.

Additionally, implementation of the process 1101 illustrated in the process flow diagram of FIG. 11 yields a relative word error rate (WER) reduction when compared to WER achieved in both unsupervised and supervised training by at least utilizing speaker embedding 1130 trained for personalized speech synthesis (see also speaker embedding 1210 of FIG. 12). For instance, the NNLM 1140 is used to generate target 1142 and/or random text (e.g. random scripts 1152) for speech synthesis. Then, the synthesized speech (see TTS data, scripts 1160) is added to the original data (see natural speech, label 1124) for model adaptation 1170 in the supervised implementation. In the unsupervised adaptation, however, only the first-pass decoding result of the original data is used in the training of the speaker embedding 1130, the NNLM generator 1140, and acoustic model adaptation (e.g., model adaptation 1170).

Several advantages are achieved with the foregoing implementations. First, unlike data augmentation with noise or speaker rate perturbation, the implementation of the disclosed embodiments can generate arbitrary personalized speech with no constraints on the content or data amount, thus fundamentally alleviating data sparsity in the adaptation data 1110. Second, these embodiments can be used to implicitly convert unsupervised training (label 1122 generated from a first pass decoding) into a pseudo-supervised training through the introduction of personalized speech synthesis. Any errors occurring from applying a labeling 1120 to the adaptation data 1110 is smoothed through the speaker embedding 1130 training, such that the rendered synthesized speech 1160 seldom exhibits perceptible mismatch with its corresponding text or scripts 1160. Consequently, when consuming the synthesized speech 1160 for model adaptation 1170, a catastrophic gradient update (a root cause for failure of unsupervised training) due to any labeling errors from a first pass decoding can be avoided.

The disclosed embodiments may comprise or utilize a special-purpose or general-purpose computer including computer hardware, such as, for example, one or more processors (such as processor(s) 102) and system memory (such as hardware storage device 104), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer, such as computing system 100.

Computing system 100 may also be connected (via a wired or wireless connection) to external sensors (e.g., one or more remote cameras) or devices via a network. For example, computing system 100 can communicate with any number devices or cloud services to obtain or process data.

In some cases, the network may itself be a cloud network. Furthermore, computing system 100 may also be connected through one or more wired or wireless networks to remote/separate computer systems(s) that are configured to perform any of the processing described with regard to computing system 100.

A "network," like network described above, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 100 will include one or more communication channels that are used to communicate with the network. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

The computer system 100 may also be configured to access a corpus of training data 140 that is located externally to the computer system 100. This corpus may be used to train, further train, tune, or refine the main model 110 of the computer system 100 in the manner described earlier.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to modify a machine learning model with text-to-speech data, the machine learning model being used for speech recognition, wherein the computing system comprises:
   one or more processors; and
   one or more computer readable hardware storage devices that store computer-executable instructions that are structured to be executed by the one or more processors to cause the computing system to at least:
   identify a main model trained with baseline training data, the main model including an acoustic model and a language model, the acoustic model and the language model being subcomponents of the main model;
   receive an input comprising a keyword;
   determining that the keyword is underrepresented in the baseline training data in response to determining that a computed confidence score for the keyword falls below a predefined confidence score threshold, the computed confidence score corresponding to an ability in which the main model is able to detect the keyword from spoken commands, wherein the keyword is one of a plurality of different keywords that the main model is trained to detect in spoken commands;
   in response to determining that the keyword is underrepresented in the baseline training data, obtain new text-to-speech (TTS) training data that is specific to the keyword; and
   modify at least the acoustic model and the language model of the main model with the new TTS training data to reduce a speech recognition error of the main model in performing speech recognition.

2. The computing system of claim 1, wherein the each of the different keywords of the plurality of different keywords corresponding to a different computed confidence score and a different keyword-dependent confidence threshold.

3. The computing system of claim 1, wherein the main model is structured as a recurrent neural network transducer (RNN-T) based model used for a keyword spotting system (KWS).

4. The computing system of claim 1, wherein the new TTS training data is obtained from a multi-speaker, neural TTS system.

5. The computing system of claim 1, wherein the execution of computer-executable instructions further causes the computing system to:
   mix at least some new TTS training data with at least some baseline training data; and
   modify at least the acoustic model and language model of the main model with the mixed training data to avoid overfitting during an adaptation of the main model.

6. The computing system of claim 5, wherein the mixed training data is modified by applying a weighting to the at least some baseline training data to balance the ratio between new TTS training data and baseline training data.

7. The computing system of claim 1, wherein the new TTS training data is further obtained by:
   passing the synthesized audio data through at least one simulation process to generate simulated audio data;
   collecting a second plurality of utterances of the particular keyword from the simulated audio data, wherein the second plurality of utterances is a plurality of simulated utterances; and
   combining the first and second pluralities of utterances to form a combined set of utterances, wherein the new TTS training data comprises the combined set of utterances.

8. A computing system configured to modify a machine learning model with text-to-speech data, the machine learning model being used for speech recognition, wherein the computing system comprises:
   one or more processors; and
   one or more computer readable hardware storage devices that store computer-executable instructions that are structured to be executed by the one or more processors to cause the computing system to at least:
      identify a main model trained with baseline training data, the main model including an acoustic model and a language model, the acoustic model and the language model being subcomponents of the main model;
      receive an input comprising a keyword;
      determining that the keyword is underrepresented in the baseline training data in response to determining that a computed confidence score for the keyword falls below a predefined confidence score threshold, the computed confidence score corresponding to a ratio of utterances that the main model correctly accepts as keyword utterances that contain the keyword relative to all utterances that the main model accepts as keyword utterances including utterances that do not contain the keyword;
      in response to determining that the keyword is underrepresented in the baseline training data, obtain new text-to-speech (TTS) training data that is specific to the keyword; and
      modify at least the acoustic model and the language model of the main model with the new TTS training data to reduce a speech recognition error of the main model in performing speech recognition.

9. The computing system of claim 8, wherein the keyword is one of a plurality of different keywords that the main model is trained to detect in spoken commands, each of the different keywords of the plurality of different keywords corresponding to a different computed confidence score and a different keyword-dependent confidence threshold, the different computed confidence scores corresponding to an ability in which the main model is able to detect the different keywords from the spoken commands based on a determination that a corresponding computed confidence score is equal to or exceeds a value defined by the keyword-dependent confidence threshold.

10. The computing system of claim 8, wherein the main model is structured as a recurrent neural network transducer (RNN-T) based model used for a keyword spotting system (KWS).

11. The computing system of claim 8, wherein the new TTS training data is obtained from a multi-speaker, neural TTS system.

12. The computing system of claim 8, wherein the execution of computer-executable instructions further causes the computing system to:
   mix at least some new TTS training data with at least some baseline training data; and
   modify at least the acoustic model and language model of the main model with the mixed training data to avoid overfitting during an adaptation of the main model.

13. The computing system of claim 12, wherein the mixed training data is modified by applying a weighting to the at least some baseline training data to balance the ratio between new TTS training data and baseline training data.

14. The computing system of claim 1, wherein the new TTS training data is further obtained by:
   passing the synthesized audio data through at least one simulation process to generate simulated audio data;
   collecting a second plurality of utterances of the particular keyword from the simulated audio data, wherein the second plurality of utterances is a plurality of simulated utterances; and
   combining the first and second pluralities of utterances to form a combined set of utterances, wherein the new TTS training data comprises the combined set of utterances.

15. A computing system configured to modify a machine learning model with text-to-speech data, the machine learning model being used for speech recognition, wherein the computing system comprises:
   one or more processors; and
   one or more computer readable hardware storage devices that store computer-executable instructions that are structured to be executed by the one or more processors to cause the computing system to at least:
      identify a main model trained with baseline training data, the main model including an acoustic model and a language model, the acoustic model and the language model being subcomponents of the main model;
      receive an input comprising a keyword;
      determining that the keyword is underrepresented in the baseline training data in response to determining that a computed confidence score for the keyword falls below a predefined confidence score threshold, the computed confidence score corresponding to a measure of utterances that the main model incorrectly accepts as keyword utterances;
      in response to determining that the keyword is underrepresented in the baseline training data, obtain new text-to-speech (TTS) training data that is specific to the keyword; and
      modify at least the acoustic model and the language model of the main model with the new TTS training data to reduce a speech recognition error of the main model in performing speech recognition.

16. The computing system of claim 15, wherein the keyword is one of a plurality of different keywords that the main model is trained to detect in spoken commands, each of the different keywords of the plurality of different keywords corresponding to a different computed confidence score and a different keyword-dependent confidence threshold, the different computed confidence scores corresponding to an ability in which the main model is able to detect the different keywords from the spoken commands based on a determination that a corresponding computed confidence score is equal to or exceeds a value defined by the keyword-dependent confidence threshold.

17. The computing system of claim 15, wherein the main model is structured as a recurrent neural network transducer (RNN-T) based model used for a keyword spotting system (KWS).

18. The computing system of claim 15, wherein the new TTS training data is obtained from a multi-speaker, neural TTS system.

19. The computing system of claim 15, wherein the execution of computer-executable instructions further causes the computing system to:
   mix at least some new TTS training data with at least some baseline training data; and
   modify at least the acoustic model and language model of the main model with the mixed training data to avoid overfitting during an adaptation of the main model.

20. The computing system of claim 19, wherein the mixed training data is modified by applying a weighting to the at least some baseline training data to balance the ratio between new TTS training data and baseline training data.

\* \* \* \* \*